(12) United States Patent
Zhang et al.

(10) Patent No.: US 10,424,806 B2
(45) Date of Patent: Sep. 24, 2019

(54) ORGANIC NON-AQUEOUS CATION-BASED REDOX FLOW BATTERIES

(71) Applicant: UCHICAGO ARGONNE, LLC, Chicago, IL (US)

(72) Inventors: Lu Zhang, Lisle, IL (US); Jinhua Huang, Willowbrook, IL (US); Anthony Burrell, Naperville, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 0 days.

(21) Appl. No.: 15/962,563

(22) Filed: Apr. 25, 2018

(65) Prior Publication Data

US 2018/0248218 A1 Aug. 30, 2018

Related U.S. Application Data

(60) Division of application No. 14/476,202, filed on Sep. 30, 2014, now Pat. No. 9,966,625, which is a continuation-in-part of application No. 13/407,409, filed on Feb. 28, 2012, now Pat. No. 9,300,000.

(51) Int. Cl.
  *H01M 8/18* (2006.01)
  *H01M 8/20* (2006.01)
  *H01M 4/90* (2006.01)

(52) U.S. Cl.
  CPC ............. *H01M 8/188* (2013.01); *H01M 8/20* (2013.01); *H01M 4/9008* (2013.01); *H01M 2300/0028* (2013.01); *Y02E 60/528* (2013.01)

(58) Field of Classification Search
  None
  See application file for complete search history.

(56) References Cited

U.S. PATENT DOCUMENTS

| | | | |
|---|---|---|---|
| 5,366,824 A | 11/1994 | Nozaki | |
| 5,708,123 A * | 1/1998 | Johannsen | C07D 487/04 528/125 |
| 5,709,968 A | 1/1998 | Shimizu | |
| 6,692,862 B1 | 2/2004 | Zocchi | |

(Continued)

OTHER PUBLICATIONS

Abraham, K.M. et al., n-Butylferrocene for Overcharge Protection of Secondary Lithium Batteries, Journal of the Electrochemical Society, 137 (6), 1856-1857 (1990).

(Continued)

*Primary Examiner* — Amanda J Barrow
(74) *Attorney, Agent, or Firm* — Olson & Cepuritis, Ltd.

(57) ABSTRACT

The present invention provides a non-aqueous redox flow battery comprising a negative electrode immersed in a non-aqueous liquid negative electrolyte, a positive electrode immersed in a non-aqueous liquid positive electrolyte, and a cation-permeable separator (e.g., a porous membrane, film, sheet, or panel) between the negative electrolyte from the positive electrolyte. During charging and discharging, the electrolytes are circulated over their respective electrodes. The electrolytes each comprise an electrolyte salt (e.g., a lithium or sodium salt), a transition-metal free redox reactant, and optionally an electrochemically stable organic solvent. The redox reactant of the positive electrolyte is a dialkoxybenzene compound, and the redox reactant of the negative electrolyte is a viologen compound or a dipyridyl ketone.

14 Claims, 22 Drawing Sheets

(56) References Cited

U.S. PATENT DOCUMENTS

| | | | |
|---|---|---|---|
| 6,872,376 B2 | 3/2005 | Tanaka et al. | |
| 7,258,947 B2 | 8/2007 | Kubata et al. | |
| 7,320,844 B2 | 1/2008 | Skyllas-Kazacos | |
| 9,300,000 B2* | 3/2016 | Jansen | H01M 8/188 |
| 9,966,625 B2* | 5/2018 | Zhang | H01M 8/20 |
| 2004/0191635 A1 | 9/2004 | Otsuki et al. | |
| 2010/0047671 A1 | 2/2010 | Chiang et al. | |
| 2010/0081059 A1 | 4/2010 | Exnar et al. | |
| 2010/0151356 A1* | 6/2010 | Watt | H01M 4/9008 |
| | | | 429/506 |
| 2010/0297481 A1 | 11/2010 | Son et al. | |
| 2010/0323264 A1 | 12/2010 | Chiang et al. | |
| 2011/0052945 A1 | 3/2011 | Whitacre | |
| 2011/0189549 A1 | 8/2011 | Sun et al. | |
| 2011/0195283 A1 | 8/2011 | Sun et al. | |
| 2011/0200848 A1 | 8/2011 | Chiang et al. | |
| 2013/0189571 A1 | 7/2013 | Abouimrane et al. | |
| 2015/0191470 A1* | 7/2015 | Fahrenbach | C07D 471/22 |
| | | | 526/259 |

OTHER PUBLICATIONS

Amine, K., Develop and Evaluate Materials and Additives That Enhance Thermal and Overcharge Abuse, Department of Energy, (Argonne National Laboratory), Advanced Battery Research Review, Washington, D.C. (2010).

Armand, M. et al., Conjugated Dicarboxylate Anodes for Li-ion Batteries, Nature Materials, 8 (2), 120-125 (2009).

Behl, W. K. et al., Electrochemical Overcharge Protection of Rechargeable Lithium Batteries, I. Kinetics of Iodide/Tri-Iodine Redox Reactions on Platinum LiAsF6/Tetrahydrofuran Solutions, Journal of the Electrochemical Society, 135 (1), 16-21 (1988).

Behl, W. K. et al., Electrochemical Overcharge Protection of Rechargeable Lithium Batteries, II. Effect of Lithium Iodide-Iodine Additives on the Behavior of Lithium Electrode in LiAsF6-Tetrahydrofuran Solutions, Journal of the Electrochemical Society, 135 (1), 21-25 (1988).

Brushett, F.R. et al., An All-Organic Non-Aqueous Lithium-Ion Redox Flow Battery, Advanced Energy Materials, 1-7, (2012).

Buhrmester, C. et al., Studies of Aromatic Redox Shuttle Additives for LiFePO4-Based Li-Ion Cells, Journal of the Electrochemical Society, 152 (12) A2390-A2399 (2005).

Chakrabarti, M.H. et al., Evaluation of Electrolytes for Redox Flow Battery Applications, Electrochimica Acta, 52 (5), 2189-2195 (2007).

Chang, D.W. et al., Novel Quinoxaline-Based Organic Sensitizers for Dye-Sensitized Solar Cells, Organic Letters 13 (15), 3880-3883 (2011).

Chen, Z. et al., Redox Shuttles for Safer Lithium-Ion Batteries, Electrochimica Acta, 54 (24), 5605-5613 (2009).

Chen, Z. et al., Lithium Borate Cluster Salts as Redox Shuttles for Overcharge Protection of Lithium-Ion Cells, Electrochemical and Solid State Letters, 13 (4), A39-A42 (2010).

Crabtree, G. et al., Integrating Renewable Electricity on the Grid—A Report by the APS Panel on Public Affairs, American Physical Society, Washington, D.C. (2010).

Dudata, M. et al., Semi-Solid Lithium Rechargeable Flow Battery, Advanced Energy Materials, 1 (4) 511-516 (2011).

Eyer, J. et al., Energy Storage for the Electricity Grid: Benefits and Market Potential Assessment Guide, A Study for the DOE Energy Storage Systems Program, Sandia National Laboratories (2010).

Kim, J.H. et al., Development of Metal-Based Electrodes for Non-aqueous Redox Flow Batteries, Electrochemistry Communication, 13 (9) 997-1000 (2011).

Lee, J.-Y et al., Low Band-Gap Polymers Based on Quinoxaline Derivatives and Fused Thiophene as Donor Materials for High Efficiency Bulk-Heterojunction Photovoltaic Cells, Journal of Materials Chemistry 19 (28), 4938-4945 (2009).

Liu, Q. et al., Non-aqueous Chromium Acetylacetonate Electrolyte for Redox Flow Batteries, Electrochemistry Communications, 12 (11), 1634-1637 (2010).

Matsuda, Y. et al., A Rechargeable Redox Battery Utilizing Ruthenium Complexes with Non-Aqueous Organic Electrolyte, Journal of Applied Electrochemistry, 18 (6), 909-914 (1988).

Liu, Q. et al., Non-aqueous Vanadium Acetylacetonate Electrolyte for Redox Flow Batteries, Electrochemistry Communications, 11, 2312-2315 (2009).

Matsunaga, T. et al., High-Performance Lithium Secondary Batteries Using Cathode Active Materials of Triquinoxalinylenes Exhibiting Six Electron Migration; Chemistry Letters 40 (7), 750-752 (2011).

Moshurchak, L.M. et al., High-Potential Redox Shuttle for Use in Lithium-Ion Batteries, Journal of the Electrochemical Society, 156 (4) A309-A312 (2009).

Ponce De Leon, C. et al., Redox Flow Cells for Energy Conversion, Journal of Power Sources, 160 (1), 716-732 (2006).

Skyllas-Kazacos, M. et al., Progress in Flow Battery Research and Development, Journal of the Electrochemical Society, 158 (8), R55-R79 (2011).

Sleightholme, A. E.S. et al., Non-aqueous Manganese Acetylacetonate Electrolyte for Redox Flow Batteries, Journal of Power Sources, 196 (13), 5742-5745 (2011).

Walker, W. et al., Ethoxycarbonyl-Based Organic Electrode for Li-Batteries, Journal of the American Chemical Society, 132 (18), 6517-6523 (2010).

Walker, W. et al., Electrochemical Characterization of Lithium 4,4'-tolane-dicarboxylate for Use as a Negative Electrode in Li-Ion Batteries, Journal of Materials Chemistry, 21 (5), 1615-1620 (2011).

Wang, W. et al., A New Redox Flow Battery Using Fe/V Redox Couples in Chloride Supporting Electrolyte, Energy & Environmental Science, 4 (10), 4068-4073 (2011).

Weber, A.Z. et al., Redox Flow Batteries: A Review, Journal of Applied Electrochemistry, 41 (10) 1137-1164 (2011).

Yang, Z. et al., Electrochemical Energy Storage for Greed Grid. Chemical Reviews, 111 (5), 3577-3613 (2011).

Yamamura, T. et al., Electrochemical Investigation of Uranium β-diketonates for All-Uranium Redox Flow Battery, Electrochimica Acta 48, 43-50 (2002).

Zhen, L. et al., Electrochemical Properties of an All-Organic Redox Flow Battery Using 2,2,6,6-Tetramethyl-1-Piperidinyloxy and N-Methylphthalimide, Electrochemical and Solid State Letters, 14 (12), A171-A173 (2011).

* cited by examiner

| Name | Redox Potential (V vs. Li/Li⁺) | |
|---|---|---|
| | Lower Event | Upper Event |
| Quinoxaline | 2.649 ± 0.005 | 3.07 ± 0.02 |
| 2-methylquinoxaline | 2.609 ± 0.006 | 2.94 ± 0.02 |
| 5-methylquinoxaline | 2.643 ± 0.004 | 2.92 ± 0.02 |
| 6-methylquinoxaline | 2.609 ± 0.006 | 3.04 ± 0.02 |
| 2,3-dimethylquinoxaline | 2.525 ± 0.007 | 2.85 ± 0.02 |
| 2,3,6-trimethylquinoxaline | 2.484 ± 0.008 | 2.80 ± 0.02 |
| 2,3-diphenylquinoxaline | 2.690 ± 0.004 | 3.00 ± 0.02 |

FIG. 5

ORGANIC NON-AQUEOUS CATION-BASED REDOX FLOW BATTERIES

CROSS-REFERENCE TO RELATED APPLICATIONS

This application is a division of U.S. application Ser. No. 14/476,202, filed on Sep. 3, 2014, which is a continuation-in-part of U.S. application Ser. No. 13/407,409, filed on Feb. 28, 2012, now U.S. Pat. No. 9,300,000 B2, issued Mar. 29, 2016, each of which is incorporated herein by reference in its entirety.

CONTRACTUAL ORIGIN OF THE INVENTION

The United States Government has rights in this invention pursuant to Contract No. DE-AC02-06CH11357 between the United States Government and UChicago Argonne, LLC representing Argonne National Laboratory.

FIELD OF THE INVENTION

This invention relates to redox flow batteries. More particularly, this invention relates to non-aqueous cation-based redox flow batteries utilizing organic redox materials.

BACKGROUND OF THE INVENTION

A growing need exists for large-scale energy storage systems that can support electrical transmission grids and enable the reliable implementation of intermittent renewable energy sources [1, 2]. Redox flow batteries are considered promising devices for these applications due to their scalability, durability, and transportability [3, 4]. Most flow batteries are based on aqueous electrochemistry and are thus limited by the electrochemical properties of water. Transitioning to organic electrolytes enables the development of flow batteries which can operate in larger windows of electrochemical stability, and can achieve higher energy densities and higher energy efficiencies.

Low-cost, scalable energy storage systems are needed to improve the energy efficiency of the electrical grid (e.g., load-leveling, frequency regulation) and to facilitate the large-scale penetration of renewable energy resources (e.g., wind, solar) [1, 2]. While alternative energy technologies exist, they cannot be directly connected to the grid because of their variable output. Electrochemical energy storage may provide the best combination of efficiency, cost, and flexibility to enable these applications [5]. Of particular interest are redox flow batteries, which are rechargeable electrochemical energy storage devices that utilize the oxidation and reduction of two soluble electroactive species for charging (absorbing energy) and discharging (delivering energy) [6]. Unlike conventional secondary batteries, the energy-bearing species are not stored within an electrode structure but in separate liquid reservoirs and pumped to and from the power converting device when energy is being transferred. Because of this key difference, flow battery systems can be more durable than conventional battery systems as electrode reactions are not accompanied by morphological changes due to the insertion or removal of the active species and can be more scalable than conventional battery systems as the energy capacity may be easily and inexpensively modulated by varying the reservoir volume or the species concentration, without sacrificing power density. Thus, while flow batteries may not compete with compact lithium (Li)-ion batteries for portable applications (e.g., cell phones, laptops) due to lower overall energy densities, they are well-suited for large-scale stationary applications.

Since their inception in the 1960s, a large number of aqueous redox flow batteries have been developed including iron-chromium, bromine-polysulfide, vanadium-bromine, and all-vanadium systems [3, 4, 6]. Several aqueous hybrid systems also have been developed, where one or both electrode reactions are a deposition/dissolution process, such as zinc-bromine and soluble lead-acid systems. Though several of these aqueous technologies have been successfully demonstrated at the megawatt-scale, none have experienced widespread commercialization due to low energy densities, low round-trip energy efficiencies, and high costs. Indeed, all flow batteries based on aqueous electrochemical couples are limited by the electrochemical properties of water, which is only stable within a small potential window (typically 1.2-1.6 V) outside of which water electrolysis occurs. Employing non-aqueous electrolytes offers a wider window of electrochemical stability, which, in turn, enables flow batteries to operate at higher cell potentials (e.g., >2 V). If appropriate redox couples can be identified, operating at higher cell voltages leads to greater system energy (and power) densities and higher energy efficiencies. Moreover, as fewer cell units and ancillary parts would be required to achieve the same power output as an aqueous system, hardware costs would be significantly reduced and system reliability increased. In contrast to their aqueous counterparts, only a few non-aqueous flow batteries have been reported. The majority of the reported non-aqueous flow batteries are anion-exchange systems which employ single electrolytes composed of metal-centered coordination complexes [7-12]. Matsuda et al. demonstrated a system based on a ruthenium bipyridine complex with an open circuit potential (OCP) of 2.6 V [7]. Thompson and co-workers have investigated vanadium, chromium, and manganese acetylacetonate-based systems with OCPs of 2.2, 3.4, and 1.1 V, respectively [9-11]. Kim et al. recently reported systems with two different coordination complexes for the negative and positive electrode reactions based on nickel bipyridine and iron bipyridine as the negative and positive electrodes, respectively, with an OCP of 2.4 V [12]. Despite their promising cell potentials, these systems have been hampered by low efficiencies and the limited solubility of coordination complexes.

In general, Li-ion batteries have round-trip efficiencies of >95% and can have cell voltages over 4 V. Chiang and co-workers recently reported a high energy density semi-solid flow battery based on a slurry suspension of lithium intercalation materials [13]. Questions remain regarding long term durability, scalability, and cost of such systems, however.

High potential organic redox shuttles are employed in Li-ion battery packs to prevent overcharging of individual cells which can lead to thermal runaway and catastrophic failure [14]. Generally, the redox shuttle molecule activates at a defined potential slightly higher than the end-of-charge potential of the positive electrode. At this potential, the redox molecule oxidizes on the positive electrode, migrates to and reduces on the negative electrode, and then diffuses back to the positive electrode completing an internal ionic circuit, which holds the cell at a stable potential. First proposed in the 1980s, this technology has benefitted from three decades of effort leading to a suite of robust materials [15-18]. During typical validation studies, overcharge materials are tested in Li-ion coin cells charged to twice the positive electrodes capacity (approximately 100% overcharge). During each overcharge cycle, individual molecules shuttle between the two electrodes hundreds of times and remain stable in their oxidized state, typically as a radical cation, for 1 to 10 seconds or more.

There is an ongoing need for new, more efficient, redox flow batteries. The present invention addresses this need by providing a non-aqueous redox flow battery based on oxidation and reduction of organic electroactive materials at the negative and positive electrodes and cation exchange involving transfer of cations such as alkali metal ions (e.g., lithium and sodium), and alkaline earth metal ions (e.g., magnesium and calcium) to balance charges resulting from the redox reactions.

SUMMARY OF THE INVENTION

The present invention provides a non-aqueous redox flow battery comprising a negative electrode (which functions as a current collector) immersed in a first liquid electrolyte (also referred to herein as a "negative electrolyte" or "anolyte"), a positive electrode (which also functions as a current collector) immersed in a second liquid electrolyte (also referred to herein as a "positive electrolyte" or "catholyte"), and a cation-permeable separator (e.g., a membrane or other cation-permeable material) partitioning the negative electrode/anolyte from the positive electrode/catholyte. During charging and discharging, the electrolytes are circulated over their respective electrodes, while cations shuttle between the two electrolytes to balance the charges that develop as a result of oxidation and reduction of components in the electrolytes.

The anolyte and the catholyte both comprise a transition metal-free redox reactant and an electrolyte salt (i.e., a single salt or a combination of two or more different salts). The redox reactant of the catholyte is selected to have a higher redox potential than the redox reactant of the anolyte. In some preferred embodiments, the anolyte and catholyte include an electrochemically stable organic solvent. In other embodiments, the redox reactant is a liquid material and no solvent is present.

The redox reactants can be an organic compound comprising a conjugated unsaturated moiety, a boron cluster compound, or a combination thereof. The conjugated unsaturated moiety can be aromatic, non-aromatic, or a combination thereof, and can comprise carbon-carbon unsaturated bonds, carbon-heteroatom unsaturated bonds, or a combination of carbon-carbon and carbon-heteroatom unsaturated bonds. The heteroatom of any carbon-heteroatom bond is a non-metallic heteroatom (e.g., N, O, S) or a metalloid heteroatom (e.g., B).

In some embodiments, the redox reactant of the anolyte is selected from a quinoxaline compound (e.g., a quinoxaline compound bearing at least one electron-donating substituent), a dipyridyl ketone compound, a viologen compound (e.g., a bis-benzyl viologen salt, an ethyl viologen salt, and the like), and a benzophenone compound. The redox reactant of the catholye in some embodiments is selected from a 1,4-dialkoxybenzene compound (e.g., a 2,5-di-tert-butyl-1,4-dialkoxybenzene compound), a phenothiazine compound, a catechol ether compound, a catecholborane compound (e.g., a halogenated 5-phenyl-1,3,2-benzodioxaborole compound), a borane cluster compound (e.g., a halogen-substituted $B_{12}$ borane compound), a 1,3 benzodioxole compound (e.g., a 4,6-di-tert-butyl-1,3-benzodioxole), a benzodioxin compound (e.g., a 5,7-di-tert-butyl-benzodioxin, a 1,4-dialkoxy-2,5 bisphosphinyl benzene compound, a 1,4-phenylene diphosphate ester compound (e.g., a 2,5-di-tert-butyl-1,4-phenylene diphosphate ester), and a phenazine compound.

The cation-permeable separator is adapted to allow cations to cross the membrane to balance out charges in the anolyte and catholyte that develop during the charging and discharging of the battery.

The electrolyte salts can comprise, for example, alkali metal salts, alkaline earth salts, organic salts, and the like. In some preferred embodiments, the electrolyte salts utilized in anolyte and catholyte are alkali metal salts (e.g., lithium salts such as lithium tetrafluoroborate or lithium hexafluorophosphate, or sodium salts).

Preferred organic solvents for use in the electrolytes include organic carbonates, such as ethylene carbonate, propylene carbonate, dimethyl carbonate, diethyl carbonate, and ethyl methyl carbonate; as well as, for example, ethers, esters, and nitriles.

As shown herein, non-aqueous redox flow batteries utilizing transition metal-free redox reactants and electrolytes with cation-exchange capabilities (e.g., lithium-based electrolytes, sodium-based electrolytes, and the like) provide an attractive alternative to existing aqueous flow batteries and flow batteries utilizing only transition metal-based redox materials. The performance capabilities of the non-aqueous redox flow batteries described herein can be tailored by selection of the particular redox reactant materials, by the choice of electrolyte salt (e.g., alkali metal salts, alkaline earth salts, organic salts, and the like), as well as by the choice of solvent, if any, utilized in the electrolyte compositions.

Particularly advantageous positive redox materials for use in the redox flow batteries described herein include compounds of Formula (III):

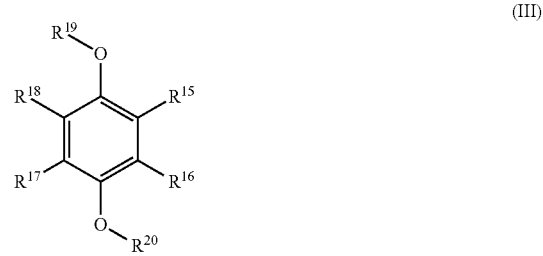

(III)

in which each of $R^{15}$, $R^{16}$, $R^{17}$, and $R^{18}$ independently is a halogen (preferably each of $R^{15}$, $R^{16}$, $R^{17}$, and $R^{18}$ is F) and each of $R^{19}$ and $R^{20}$ independently is alkyl (e.g., methyl or ethyl) or alkoxyalkyl (e.g., methoxyethyl). In some preferred embodiments of the compound of Formula (III) each of $R^{15}$, $R^{16}$, $R^{17}$, and $R^{18}$ is F, and each of $R^{19}$ and $R^{20}$ is methyl, ethyl, or methoxyethyl (i.e., the compounds are tetrafluorohydroquinone ethers).

Other advantageous positive redox materials for use in the redox flow batteries described herein include compounds of Formula (V):

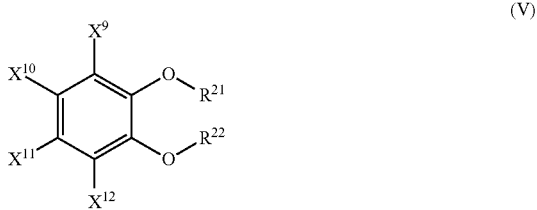

(V)

in which each of $X^9$, $X^{10}$, $X^{11}$, and $X^{12}$ independently is a halogen (preferably each of $X^9$, $X^{10}$, $X^{11}$, and $X^{12}$ is F) and each of $R^{21}$ and $R^{22}$ independently is alkyl (e.g., methyl or ethyl) or alkoxyalkyl (e.g., methoxyethyl). In some preferred embodiments of the compound of Formula (V) each of $X^9$, $X^{10}$, $X^{11}$, and $X^{12}$ is F, and each of $R^{21}$ and $R^{22}$ is methyl, ethyl, or methoxyethyl (i.e., the compounds are tetrafluorocatechol ethers).

F substituents on the aromatic ring of the compounds of Formula (III) and Formula (V) are advantageous, because F is the smallest known electron-withdrawing group, the strong electron-withdrawing effect of F groups improves the redox potential of the compounds, the pi-donating character of F groups can stabilize the radical cation formed during redox reactions, and F groups can lead to better solubility.

BRIEF DESCRIPTION OF THE DRAWINGS

FIG. 5 provides a table of redox potentials are determined by analysis of cyclic voltammograms over a range of scan rates. For all evaluations, the redox species concentration was 0.005 M in Electrolyte B, and studies were performed in Pt/Li/Li cell. All evaluations were performed in triplicate.

DETAILED DESCRIPTION OF THE PREFERRED EMBODIMENTS

Figure 1:
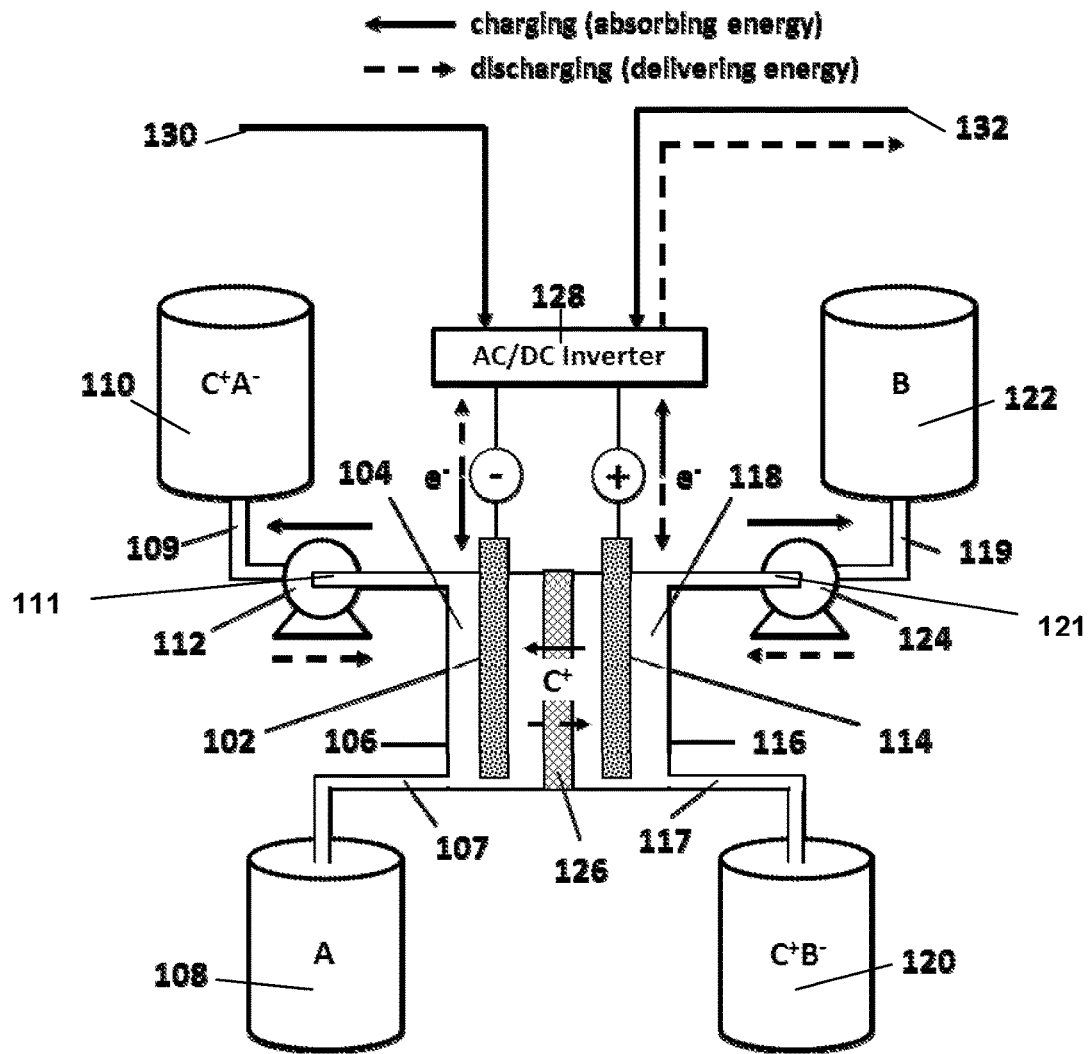
FIG. 1 provides a schematic illustration of an exemplary redox flow battery of the invention suitable for large-scale electrochemical energy storage. Species A and B represent generic negative and positive redox reactant electrode materials, respectively. Species $C^+$ represents a generic cation, which shuttles across a separator to maintain electroneutrality.

The present invention provides non-aqueous redox flow batteries. In some preferred embodiments, the flow battery comprises, consists essentially of, or consists of a negative electrode immersed in an anolyte, a positive electrode immersed in a catholyte, and a cation-permeable separator to allow cations to shuttle between the anolyte and the catholyte during charging and discharging. The negative electrode and positive electrode each act as current collectors.

The anolyte and catholyte each comprises, consists essentially of, or consists of an electrolyte salt and a transition metal-free redox reactant. In some preferred embodiments, the salt and redox reactant are dissolved in an electrochemically stable organic solvent. When no solvent is utilized, the redox reactant is a liquid material. The redox reactant of the catholyte is selected to have a higher redox potential than the redox reactant of the anolyte. The cation component of the electrolyte salts shuttles between the anolyte and the catholyte through the cation-permeable separator to balance charges that develop during the oxidation and reduction of the redox materials.

The electrolyte salt components of the anolyte and catholyte can be any electrochemically stable salt. The electrolytes can include a single salt or a combination of two or more salts. The cation component of the salt can be any monovalent (e.g., Li$^+$, Na$^+$, Ag$^+$, Cu$^+$, NH$_4^+$, and the like) or multivalent cation (e.g., Mg$^{2+}$, Ca$^{2+}$, Cu$^{2+}$, Zn$^{2+}$, and the like). In some preferred embodiments, the cation comprises an alkali metal ion, an alkaline earth metal ion, and/or an organic cation. Non-limiting examples of alkali metal cations include lithium and sodium. Non-limiting examples of alkaline earth metal ions include magnesium and calcium. Non-limiting examples of organic cations include tetraalkyl ammonium ions. The anionic component of the electrolyte salts can be any anion suitable for use in non-aqueous electrolytes for lithium or sodium ion-type batteries. Some non-limiting examples of suitable anionic components of the alkali metal salts include tetrafluoroborate ion (BF$_4^-$), hexafluorophosphate ion (PF$_6^-$), perchlorate ion (ClO$_4^-$), hexafluoroarsenate ion (AsF$_6^-$), trifluoromethanesulfonate ("triflate" or CF$_3$SO$_3^-$) ion, bis(perfluoroethanesulfonyl)imide (BETI) ion (N(SO$_2$CF$_2$CF$_3$)$_2^-$), bis(oxalato)borate (BOB) ion (B(C$_2$O$_4$)$_2^-$), and a halogen-substituted borane (B$_{12}$X$_n$H$_{(12-n)}^{2-}$; X=halogen) ion. In some embodiments, bis(trifluoromethanesulfonyl)imide (TFSI) ion (N(SO$_2$CF$_3$)$_2^-$) can be utilized as the anion component of the electrolyte salt in the catholyte. The electrolyte salts of the anolyte and catholyte can be different materials or can be composed of the same material or materials. Non-limiting examples of some preferred salts include, e.g., LiBF$_4$, LiPF$_6$, lithium triflate, NaBF$_4$, NaPF$_6$, and sodium triflate.

The electrochemically stable organic solvent components of the negative and positive electrolytes can be composed of a single solvent or a combination of two or more solvents. The solvent or solvents of the anolyte can be the same as the solvent or solvents of the catholyte, or the anolyte and catholyte can comprise different solvents. Similarly, in some embodiments, the redox reactant of one or both of the anolyte and catholyte can be a liquid material and, if desired, a solvent can be omitted. Any organic solvents that are suitable for use in non-aqueous alkali metal ion (e.g., lithium ion) batteries, for example, can be utilized. Such solvents are well known in the battery art, and include, for example, organic carbonates (e.g., ethylene carbonate, propylene carbonate, ethyl methyl carbonate, and the like), ethers (e.g., diethyl ether, tetrahydrofuran, 2-methyl tetrahydrofuran, dimethoxyethane, and 1,3 dioxolane), esters (e.g., methyl formate, gamma-butyrolactone, and methyl acetate), and nitriles (e.g., acetonitrile). Preferably, the solvents comprise, consist essentially of, or consist of one or more organic carbonates such as ethylene carbonate (EC), propylene carbonate (PC), dimethyl carbonate (DMC), diethyl carbonate (DEC), ethyl methyl carbonate (EMC), or a combination of two or more of the foregoing carbonates. Examples of some preferred solvents include propylene carbonate, and mixtures of ethylene carbonate and ethyl methyl carbonate in an EC/EMC volume or weight ratio of about 3/7.

The negative electrode of the battery is positioned within a negative electrolyte chamber ("NE chamber") that contains the negative electrolyte (i.e., anolyte). The NE chamber is defined by a first housing or enclosure. The NE chamber is adapted to communicate with a first negative electrolyte reservoir ("NE reservoir") and a second NE reservoir (e.g., via openings, valves, tubing, and the like to connect the interior of the housing/enclosure with the interior of the reservoirs). The first NE reservoir, the NE chamber, and the second NE reservoir together define a negative electrolyte circulation pathway. A pump is operably positioned within the negative electrolyte circulation pathway to facilitate circulation of the negative electrolyte back and forth between the first NE reservoir and the second NE reservoir over the negative electrode. The pump can be positioned in any convenient location in the negative electrolyte flow pathway (e.g., between the first NE reservoir and the NE chamber, between the second NE reservoir and the NE chamber, or integral with a portion of the NE chamber or NE reservoirs). The negative electrode can comprise, consist essentially of, or consist of a metal (e.g., platinum, copper, aluminum, nickel or stainless steel), a carbon material (e.g., carbon black, activated carbon, amorphous carbon, graphite, graphene, or a nanostructured carbon material), or a combination thereof. The electrode can be porous, fluted, or smooth.

The positive electrode of the battery is positioned within a positive electrolyte chamber ("PE chamber"), which contains the positive electrolyte (i.e., catholyte). The PE chamber is defined by a second housing or enclosure. The PE chamber is adapted to communicate with a first positive electrolyte reservoir ("PE reservoir") and a second PE reservoir (e.g., via openings, valves, tubing, and the like to connect the interior of the housing/enclosure with the interior of the reservoirs). The first PE reservoir, the PE chamber, and the second PE reservoir together define a positive electrolyte circulation pathway. A pump is operably positioned within the positive electrolyte circulation pathway to facilitate circulation of the positive electrolyte back and forth between the first PE reservoir and the second PE reservoir over the positive electrode. The pump can be positioned in any convenient location in the positive electrolyte flow pathway (e.g., between the first PE reservoir and the PE chamber, between the second PE reservoir and the PE chamber, or integral with a portion of the PE chamber or PE reservoirs). The positive electrode can comprise, consist essentially of, or consist of a metal (e.g., platinum, copper, aluminum, nickel or stainless steel), a carbon material (e.g., carbon black, activated carbon, amorphous carbon, graphite, graphene, or a nanostructured carbon material), or a combination thereof. The electrode can be porous, fluted, or smooth.

Pumps suitable for use in the flow batteries described herein include internal gear pumps, screw pumps, shuttle block pumps, flexible vane pumps, sliding vane pumps, circumferential piston pumps, helical twisted root pumps, piston pumps, diaphragm pumps, peristaltic pumps, centrifugal pumps, and the like, which are well known in the liquid pumping art. The utility of a given pump will be dependent on the chemical resistance of the pump to the electrolyte components in contact therewith (i.e., materials compatibility).

A cation-permeable separator is situated between the NE chamber and the PE chamber. The separator is adapted to allow cations to flow back and forth between the negative and positive electrolytes upon charging and discharging of the battery. The separator can be, for example, a cation-permeable membrane, sheet, panel, or film that is permeable to the cations of the electrolytes. In some embodiments, the separator is at least partially impermeable to the redox components of the electrolytes, although this is not an absolute requirement for the batteries of the present invention.

In some embodiments, the first and second housings or enclosures for the electrodes are integral with one another, and the cation-permeable separator is mounted as an internal partition separating the NE chamber from the PE chamber. In other embodiments, the first and second housings can be separate components that include perforations or openings that contact the separator, such that cations can flow between the NE chamber and the PE chamber, optionally along with some of the solvent and or redox component, and the separate housings are sealed, e.g. by gaskets, around the partition.

Non-limiting examples of suitable separator materials include, NAFION® type ion exchange membranes (sulfonated tetrafluoroethylene-based fluoropolyrner-copolymers), other porous polymeric materials such as, for example, sulfonated poly(ether ether ketones), polysulfones, polyethylene, polypropylene, ethylene-propylene copolymers, polyimides, polyvinyldifluorides, and the like, which can be in the form of membranes, matrix-supported gels, sheets, films, or panels. Other suitable materials include porous ceramics, porous insulated metals, cation-conducting glasses, and zeolites. Alternatively, the separator can be an interface between immiscible liquids. In such case, a porous film, panel, or mesh might be included to aid in maintaining separation between the liquids (e.g., as a physical support or guide to aid in maintaining laminar flow at the interface).

During charging of the battery, an electric potential is applied to the negative and positive electrodes, while simultaneously pumping the negative electrolyte (anolyte) over the negative electrode from the first NE reservoir to the second NE reservoir, and pumping the positive electrolyte (catholyte) over the positive electrode from the first PE reservoir to the second PE reservoir. Cations flow across the cation-permeable separator to balance the charges. The negative redox reactant is reduced and stored in the second NE reservoir, while the positive redox reactant is oxidized and stored in the second PE reservoir. In this way, energy can be stored by charging the battery from an energy source during off-peak usage periods.

During discharge, the electrodes are placed in a circuit (e.g., with a power grid) and the direction of electrolyte flow is reversed, with the stored reduced negative redox reactant being pumped over the negative electrode back into the first NE reservoir, and the stored oxidized positive redox reactant being pumped over the positive electrode back into the first PE reservoir. Cations again flow across the cation-permeable separator (in the opposite direction) to balance the charges. The energy stored in the system can thus be directly used to perform work or can be transferred back into the power grid during peak usage periods to supplement the power supply. An AC/DC converter can be used to facilitate transfer of energy to and from an AC power grid.

The transition metal-free redox reactants are independently selected from the group consisting of an organic compound comprising a conjugated unsaturated moiety, a boron cluster compound, and a combination thereof, wherein the conjugated unsaturated moiety is aromatic, non-aromatic, or a combination thereof, and comprises carbon-carbon unsaturated bonds, carbon-heteroatom unsaturated bonds, or a combination of carbon-carbon and carbon-heteroatom unsaturated bonds, and wherein the heteroatom is a non-metallic heteroatom or a metalloid heteroatom.

In some embodiments, the redox reactant component of the negative electrolyte is selected from the group consisting of a quinoxaline compound (e.g., an alkyl-substituted or alkoxy-substituted quinoxaline compound), a dipyridyl ketone (e.g., di-(2-pyridyl) ketone and derivatives thereof bearing at least one electron donating substituent), a viologen compound (e.g., bis-benzyl viologen dichloride, ethyl viologen diperchlorate), and a benzophenone compound.

The redox reactant component of the positive electrolyte is selected to have a redox potential which is higher than that of the redox potential of the redox reactant in the negative electrolyte. Non-limiting examples of redox reactants suitable for use in the positive electrolyte include a 1,4-dialkoxy benzene compound (e.g., a 2,5-di-tert-butyl-1,4-dialkoxy benzene), a phenothiazine compound, a catechol ether compound, a catecholborane compound (e.g., a B-phenylcatecholborane compound), a borane cluster compound (e.g., a lithium halogen-substituted borane cluster), a 1,3-benzodioxole compound, a benzodioxin compound, a 1,4-dialkoxy-bisphosphinyl benzene compound, a 1,4-phenylene diphosphate ester compound, and a 5,10-dihydro-5,10-dialkylphenazine compound (e.g., 5,10-dihydro-1,5-dimethylphenazine).

In some embodiments, the organic redox reactant component of the negative electrolyte comprises a quinoxaline compound of Formula (I):

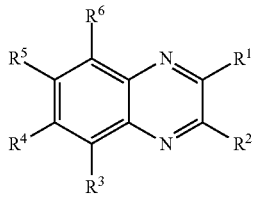

(I)

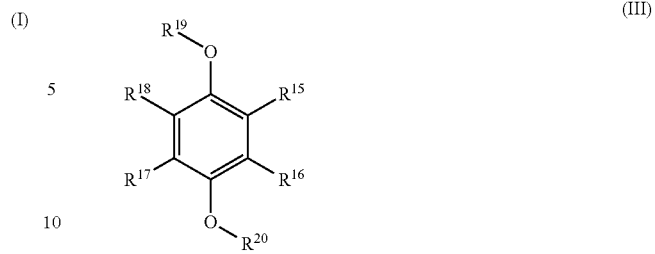

(III)

wherein each R substituent (i.e., $R^1$, $R^2$, $R^3$, $R^4$, $R^5$, and $R^6$) independently is selected from the group consisting of H, alkyl (preferably $C_1$ to $C_4$ alkyl, e.g., methyl or ethyl), phenyl, pyridyl, alkoxy (preferably $C_1$ to $C_4$ alkoxy, such as methoxy or ethoxy), halogen (e.g., Cl or F), and amino. In some preferred embodiments, each R substituent is selected from the group consisting of H, alkyl, and alkoxy. The various R substituents can be selected, e.g., to adjust the redox potential, reactivity, and solubility thereof (i.e., $R^1$, $R^2$, $R^3$, $R^4$, $R^5$, and $R^6$ need not all be the same). In some preferred embodiments, at least one (i.e., 1, 2, 3 or 4) of $R^1$, $R^2$, $R^3$ and $R^4$ is a methyl substituent, and the remaining R groups are H. In some other embodiments, $R^1$, $R^2$, and $R^3$ are methyl groups and the remaining R groups are H. Phenyl substituents, when present, preferably are $R^1$ and/or $R^2$ substituents.

In other embodiments the organic redox reactant component of the negative electrolyte comprises a dipyridyl ketone of Formula (II):

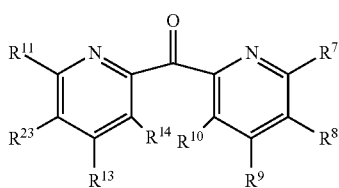

(II)

wherein each R substituent (i.e., $R^7$ through $R^{11}$) independently is selected from the group consisting of H, halogen (e.g., Cl or F), alkyl (preferably $C_1$ to $C_4$ alkyl, e.g., methyl or ethyl), phenyl, and alkoxy (preferably $C_1$ to $C_4$ alkoxy, such as methoxy or ethoxy), and amino. In one preferred embodiment, each R substituent is H. In other embodiments, each R substituent is selected from H, alkyl, and alkoxy. As in the case of Formula (I), the various R substituents can be selected, e.g., to adjust the redox potential, reactivity, and solubility thereof.

In some embodiments, the organic redox material of the negative electrolyte comprises a viologen compound (i.e., an N,N'-dialkylated 4,4'-bipyridinium compound), for example, bis-benzylviologen dichloride, bis-ethylviologen diperchlorate, and the like.

The organic redox material of the negative electrolyte also can comprise a benzophenone compound, e.g., benzophenone or a derivative thereof bearing one of more substituents such as alkyl, phenyl, alkoxy, halogen, amino, and the like.

In some embodiments, the organic redox reactant component of the positive electrolyte comprises 1,4-dialkoxybenzene compound of Formula (III):

wherein each of $R^{15}$, $R^{16}$, $R^{17}$, and $R^{18}$ independently is selected from the group consisting of H, halogen, alkyl, fluoroalkyl, alkoxy-substituted alkyl, phenyl, and amino; and each of $R^{19}$ and $R^{20}$ independently is selected from the group consisting of alkyl (preferably $C_1$ to $C_4$ alkyl, e.g., methyl or ethyl), fluoroalkyl (e.g., trifluoromethyl or 2,2,2-trifluoroethyl), and alkoxy-substituted alkyl (preferably $C_1$ to $C_4$ alkoxy, e.g., methoxy or ethoxy substituted), such as a 2-methoxyethyl group. In some preferred embodiments, $R^{19}$ and $R^{20}$ each are methyl, 2,2,2-trifluoroethyl ($-CH_2CF_3$), or 2-methoxyethyl ($-CH_2CH_2OCH_3$); and/or each of $R^{15}$ and $R^{17}$ is H, and each of $R^{16}$ and $R^{18}$ is tert-butyl. The various substituents can be selected, e.g., to adjust the redox potential, reactivity, and solubility thereof.

In some other embodiments of the compound of Formula (III) each of $R^{15}$, $R^{16}$, $R^{17}$, and $R^{18}$ independently is a halogen (preferably each of $R^{15}$, $R^{16}$, $R^{17}$, and $R^{18}$ is F) and each of $R^{19}$ and $R^{20}$ independently is alkyl (e.g., methyl or ethyl) or alkoxyalkyl (e.g., methoxyethyl). In some preferred embodiments of the compound of Formula (III) each of $R^{15}$, $R^{16}$, $R^{17}$, and $R^{18}$ is F, and each of $R^{19}$ and $R^{20}$ is methyl, ethyl, or methoxyethyl. F substituents on the aromatic ring of Formula (III) are advantageous, because F is the smallest known electron-withdrawing group, the strong electron-withdrawing effect of F groups improves the redox potential of the compounds, the pi-donating character of F groups can stabilize the radical cation formed during redox reactions, and F groups can lead to better solubility.

In other embodiments the organic redox reactant component of the positive electrolyte comprises a phenothiazine compound of Formula (IV):

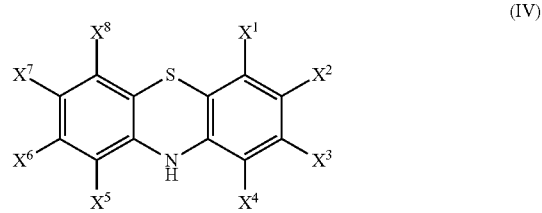

(IV)

wherein each X substituent (i.e., $X^1$ through $X^8$) independently is selected from the group consisting of H, halogen (e.g., Cl or F), alkyl (preferably $C_1$ to $C_4$ alkyl, e.g., methyl or ethyl), phenyl, and alkoxy (preferably $C_1$ to $C_4$ alkoxy, e.g., methoxy or ethoxy), and amino. In one preferred embodiment, each of the X substituents is H. The various substituents can be selected, e.g., to adjust the redox potential, reactivity, and solubility thereof.

In other embodiments the organic redox reactant component of the positive electrolyte comprises a catechol ether of Formula (V) or catechol phenylborate ester of Formula (VI):

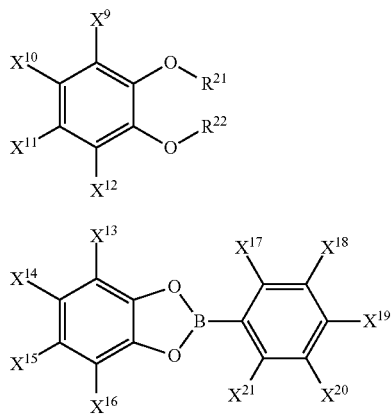

wherein each X substituent (i.e., $X^9$ through $X^{21}$) independently is selected from the group consisting of H, halogen (e.g., Cl or F), phenyl, and fluoroalkyl; and each R substituent (i.e., $R^{21}$ and $R^{22}$) independently is selected from the group consisting of H, alkyl (preferably $C_1$ to $C_4$ alkyl, e.g., methyl or ethyl), phenyl, and alkoxy-substituted alkyl (preferably $C_1$ to $C_4$ alkoxy, e.g., methoxy or ethoxy substituted), such as a 2-methoxyethyl group; or $R^{21}$ and $R^{22}$ together form an alkylene group, preferably a —$CH_2$—, or —$CH_2CH_2$— group, optionally substituted with one or more alkyl group in place of a hydrogen. In one preferred embodiment of Formula (V), each of $X^9$ through $X^{12}$ is F and $R^{21}$ and $R^{22}$ together form a —$CH_2CH_2$— group. In some preferred embodiments of Formula (VI), each of $X^{13}$ through $X^{16}$ is F and at least two of $X^{17}$ through $X^{21}$ is F or $CF_3$. The various substituents can be selected, e.g., to adjust the redox potential, reactivity, and solubility thereof.

In some other embodiments of the compound of Formula (V) each of $X^9$, $X^{10}$, $X^{11}$, and $X^{12}$ independently is a halogen (preferably each of $X^9$, $X^{10}$, $X^{11}$, and $X^{12}$ is F) and each of $R^{21}$ and $R^{22}$ independently is alkyl (e.g., methyl or ethyl) or alkoxyalkyl (e.g., methoxyethyl). In some preferred embodiments of the compound of Formula (V) each of $X^9$, $X^{10}$, $X^{11}$, and $X^{12}$ is F, and each of $R^{21}$ and $R^{22}$ is methyl, ethyl, or methoxyethyl. F substituents on the aromatic ring of Formula (V) are advantageous for the same reasons as described with respect to the compounds of Formula (III), supra.

In other embodiments the organic redox reactant component of the positive electrolyte comprises lithium halogen-substituted borane cluster of Formula (VII):

wherein n is an integer in the range of 1 to 12; and each $X^{22}$ independently is a halogen substituent (e.g., Cl or F). Preferably, n is 9, 10, 11, or 12.

FIG. 1 schematically illustrates a non-aqueous redox flow battery of the present invention. The redox flow battery comprises negative electrode 102 within negative electrolye chamber (NE chamber) 104, defined by housing 106. First negative electrolyte reservoir (NE reservoir) 108 is in fluid-flow communication with NE chamber 104 via pipe 107. Second NE reservoir 110 is operably connected to pump 112 via pipe 109, while pump 112 also is operably connected to NE chamber 104 via pipe 111. Pump 112 is adapted to facilitate transfer of negative electrolyte back and forth between first NE reservoir 108 to second NE reservoir 110 through NE chamber 104, such that the flowing electrolyte contacts negative electrode 102. The battery also includes a positive electrode 114 within positive electrolye chamber (PE chamber) 118, defined by housing 116. First positive electrolyte reservoir (PE reservoir) 120 is in fluid-flow communication with PE chamber 118 via pipe 117. Second PE reservoir 122 is operably connected to pump 124 via pipe 119, while pump 124 also is operably connected to PE chamber 118 via pipe 121. Pump 124 is adapted to facilitate transfer of positive electrolyte back and forth between first PE reservoir 120 to second PE reservoir 122 through PE chamber 118, such that the flowing electrolyte contacts positive electrode 114. Cation-permeable separator 126 separates NE chamber 104 from PE chamber 118, and allows passage of cations ($C^+$) back and forth between the positive and negative electrolytes to balance out charges that form during oxidation and reduction of materials within the electrolytes.

During charging of the redox flow battery, an electric potential is applied to the negative electrode 102 and positive electrode 114, e.g., from an energy source 130 via AC/DC converter 128, while simultaneously pumping the negative electrolyte over negative electrode 102 from first NE reservoir 108 to second NE reservoir 110, and simultaneously pumping the positive electrolyte over the positive electrode from the first PE reservoir 120 to the second PE reservoir 122. Cations ($C^+$) pass through cation-permeable separator 126 to balance the charges. A negative redox reactant material (represented by $A/A^-C^+$) and a positive redox reactant material (represented by $B/B^-C^+$) in the electrolytes undergo redox reactions upon contact with the electrodes such that the reduced form of A is stored in second NE reservoir 110, while the oxidized form of B is stored in the second PE reservoir 122. In this way, energy can be stored by charging the battery from energy source 130 during off-peak usage periods.

During discharge, the electrodes are placed in a circuit (e.g., with a power grid 132) and the direction of electrolyte flow is reversed, with the stored reduced negative electrolyte being pumped over negative electrode 102 back into first NE reservoir 108, and the stored oxidized positive electrolyte being pumped over positive electrode 114 back into first PE reservoir 120. Cations again transfer through cation-permeable separator 126 (in the opposite direction) to balance the charges resulting from redox reactions at the electrodes. The energy stored in the system during charging can thus be directly used to perform work or can be transferred into power grid 132 during peak usage periods to supplement the power supply. AC/DC converter 128 again can be used to facilitate transfer of energy to an AC power grid.

EXAMPLE 1

Figure 2:
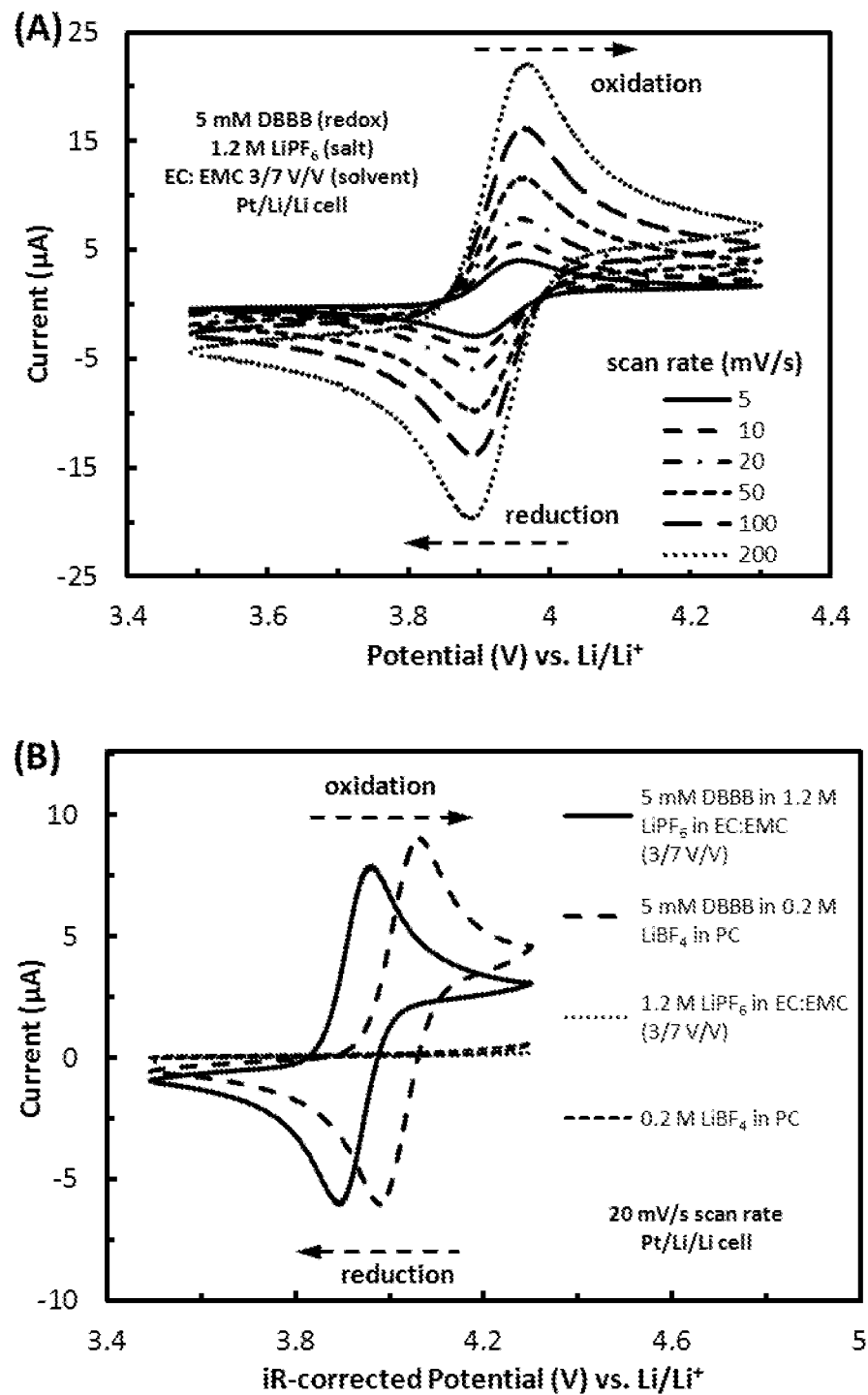
FIG. 2 shows (A) cyclic voltammograms of 0.005 M 2,5-di-tert-butyl-1,4-bis(2-methoxyethoxy)benzene (DBBB) in Electrolyte A (1.2 M $LiPF_6$ in a mixture of ethylene carbonate (EC) and ethyl methyl carbonate (EMC) in a EC/EMC volume ratio of about 3/7) at varying scan rates. (B) Comparative cyclic voltammograms of 0.005 M DBBB in Electrolyte A and in Electrolyte B (0.2 M $LiBF_4$ in propylene carbonate (PC)) at 20 mV/s. The lighter dashed cyclic voltammograms in (B) represent the baseline of each electrolyte without any redox species. All evaluations were performed in a Pt/Li/Li cell at room temperature.

2,5-Di-tert-butyl-1,4-bis(2-methoxyethoxy)benzene ("DBBB") is a redox material developed at Argonne National Laboratory for overcharge protection in Li-ion batteries [19]. DBBB has been shown to be active, at about 4.0 V vs. Li/$Li^+$, for 200 cycles of 100% overcharge in a Li-ion cell, which is approximately equivalent to 10,000 redox cycles. Moreover, the material is not air sensitive and exhibits no side reactions at any potential lower than the redox potential. FIG. 2a shows the cyclic voltammograms of 0.005 M DBBB dissolved in an electrolyte consisting of 1.2 M $LiPF_6$ in ethylene carbonate/ethyl methyl carbonate at a volume ratio of about 3 to 7 ("Electrolyte A") at scan rates ranging from 5 to 200 mV/s. DBBB displays a well-defined reversible redox couple with a redox potential of about 3.927 V vs. Li/$Li^+$, based on the average of the anodic and cathodic redox potentials [($E_{pa}+E_{pc}$)/2]. The diffusion coefficient of DBBB was determined to be about $1.30 \times 10^{-6}$ cm$^2$/s in the battery electrolyte based on Randle-Sevcik measurements [20]. However, Electrolyte A is non-ideal for flow battery applications due to high volatility, extreme moisture sensitivity, and high materials cost. Thus, an electrolyte consisting of 0.2 M LiBF$_4$ in propylene carbonate ("Electrolyte B") was also investigated as a more robust and lower cost alternative. FIG. 2b show iR-corrected cyclic voltammograms of 0.005 M DBBB in Electrolyte A and in Electrolyte B at a scan rate of 20 mV/s. Interestingly, in Electrolyte B, not only does the redox potential of DBBB shift up to 4.022 V vs. Li/Li$^+$ but also the diffusion coefficient increases to about $1.53 \times 10^{-6}$ cm$^2$/s. Thus, 2,5-di-tert-butyl-1,4-dialkoxybenzene compounds, such as DBBB, are active in different electrolyte systems, and the performance of these materials can be tailored by the choice of the electrolyte composition.

While few low potential organic redox shuttles, for overdischarge protection, have been reported in Li-ion battery literature, significant research efforts have been focused on developing organic negative electrode materials [21-23, 27]. The goal of these efforts has been to design solid-state materials rather than soluble species, which would be needed for flow battery applications. Here we demonstrate that quinoxaline and its derivatives can be utilized as negative redox materials for redox flow batteries.

Quinoxaline-derivatives have been reported as component materials in organic sensitizers for dye-sensitized solar cells [24] and in lower band gap polymers for organic photovoltaics [25]. In addition, Matsunaga et al. recently reported solid state triquinoxalinylene as an organic cathode material for Li-ion batteries with 3 quinoxaline subunits undergoing a reversible 6 electron transfer [26]. Quinoxaline is useful as a negative redox material in the redox flow batteries described herein due, at least in part, to its high solubility (≥2 M in propylene carbonate), its low molecular weight, and its ability to transfer 2 electrons per molecule. To determine structure-activity relationships, a series of quinoxaline-derivatives with different substituent groups and varying substituent locations were investigated.

Figure 3:
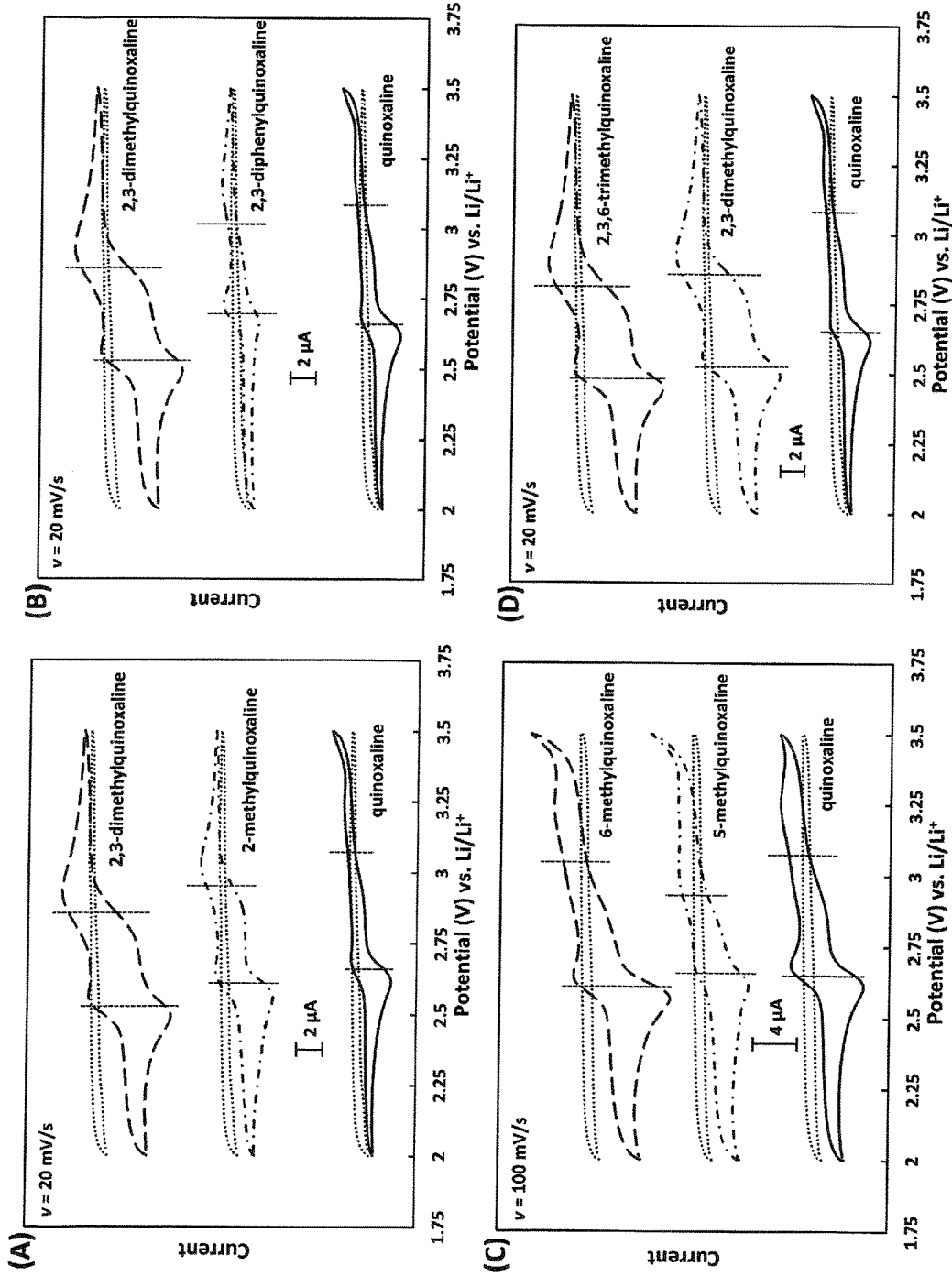
FIG. 3 shows (A) cyclic voltammograms of 2,3-dimethylquinoxaline, 2-methylquinoxaline and quinoxaline; and (B) of 2,3-dimethylquinoxaline, 2,3-diphenylquinoxaline, and quinoxaline, show the impact of adding substituent groups to the nitrogen-containing ring. (C) Cyclic voltammograms of 6-methylquinoxaline, 5-methylquinoxaline, and quinoxaline show the impact of adding substituent groups to the benzene ring. (D) Cyclic voltammograms of 2,3,6-trimethylquinoxaline, 2,3-dimethylquinoxaline, and quinoxaline show the impact of adding substituent groups to both conjugated rings. The lighter dashed cyclic voltammograms represented the electrolyte baseline without any redox species. For all evaluations, the redox species concentrations were 0.005 M, the electrolyte solution was Electrolyte B and studies were performed at room temperature in a Pt/Li/Li cell at scan rates of 20 mV/s for (A), (B), and (D) and 100 mV/s for (C).

FIG. 3a shows that substituting electron donating methyl groups onto the 2 and 3 positions of quinoxaline lowered redox potential of both electron transfer events and enhanced redox activity. While phenyl group substitutions on the nitrogen-bearing ring also enhanced redox activity, this substitution's effects on redox potential were mixed, in that the upper redox event occurred at a lower potential while the lower redox event occurred at a higher potential as compared to quinoxaline (FIG. 3b). Methyl groups were also substituted on the 5 and 6 position of the quinoxaline (FIG. 3c). The 6-methylquinoxaline showed slightly better performance than quinoxaline, whereas 5-methylquinoxaline demonstrated lower activity. Neither of these methyl group substitutions on the benzene ring had as great of an impact on the performance as the substitutions on the nitrogen-bearing ring. However, the combination of methyl substitutions on the 2, 3, and 6 positions of the quinoxaline led to the best performance of the materials that were evaluated in this study. The effects of each substitution of the redox potentials of each molecule are summarized in the table found in FIG. 5.

In general, the electron-donating properties of these small alkyl group substitutions lower redox potential of the quinoxaline compound, and enhance the activity. The effects of adding electron-withdrawing groups to the quinoxaline structure were also investigated, specifically 2,3-dichloroquinoxaline, 2-trifluoromethylquinoxaline and 2,3-bis(bromomethyl)quinoxaline were evaluated in Electrolyte B, however, no redox activity was observed in that particular electrolyte salt/organic solvent combination. 2-Acetylquinoxaline demonstrated some redox activity in Electrolyte B; however the oxidation and reduction events were separated by about 1 V. 2,3-Dihydroxyquinoxaline was not soluble in the particular electrolyte solution used in this evaluation (i.e., Electrolyte B).

Figure 23:
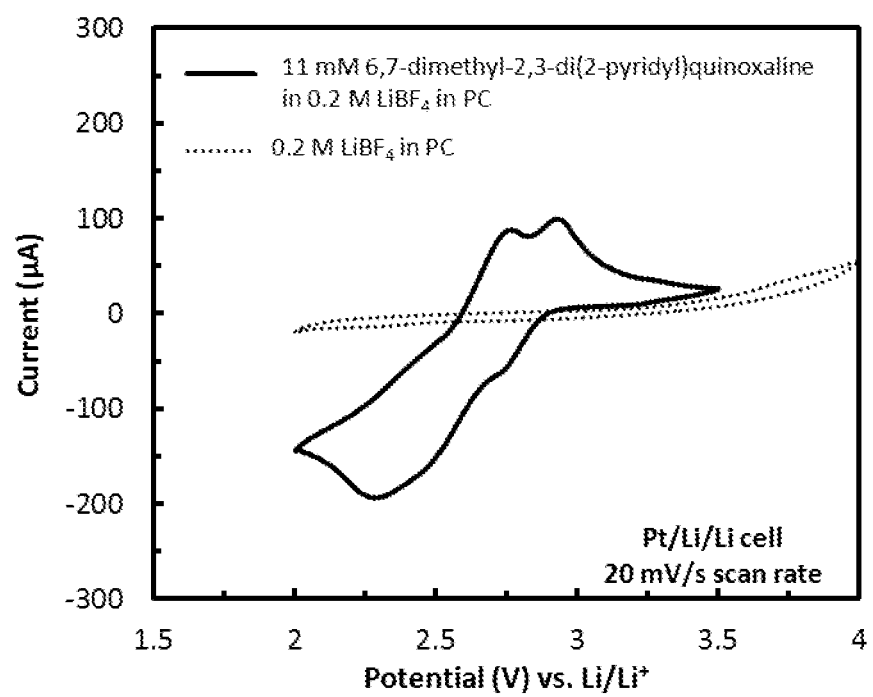
FIG. 23 shows a cyclic voltammogram of 11 mM 6,7-dimethyl-2,3-di(2-pyridyl)quinoxaline evaluated in Electrolyte B in a Pt/Li/Li cell at 20 mV/s. The lighter dashed cyclic voltammogram represents Electrolyte B without any redox species.

The upper and lower redox potentials shown in FIG. 5 were determined by a combination of average peak potential and graphical analysis of the cyclic voltammograms over a range of scan rates (5, 10, 20, 50, 100, and 200 mV/s). For the lower redox peak potentials (each in the range of about 2.5 to 2.7 V), the average peak potential method (described herein below) was used. For the upper redox peak potentials (each in the range of about 2.8 to 3.1 V), the average peak potential was estimated via graphical analysis of the cyclic voltammograms. In addition, FIG. 23 shows a cyclic voltammogram of about 11 mM 6,7-dimethyl-2,3-di(2-pyridyl)quinoxaline evaluated in Electrolyte B in a Pt/Li/Li cell at a scan rate of 20 mV/s, which exhibited a lower redox potential of about 2.6 V, and an upper redox potential in the range of about 2.8 to 2.9V, i.e., similar to those in FIG. 5.

Figure 4:
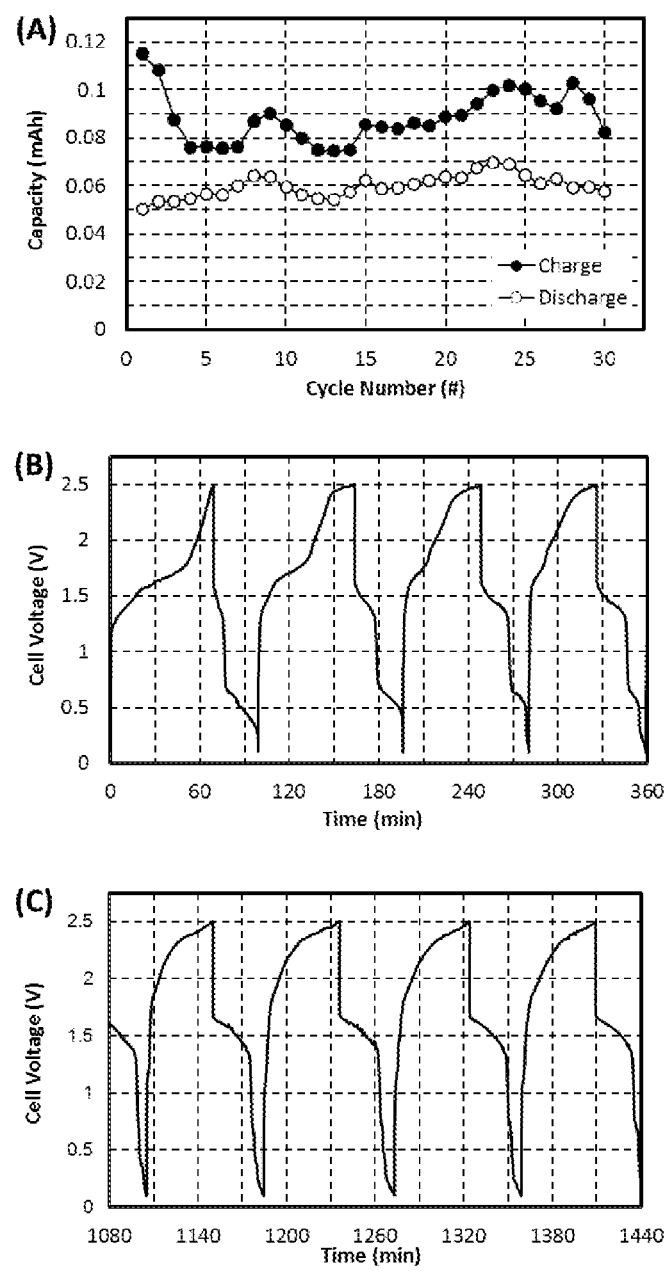
FIG. 4 shows (A) charge-discharge curves of a coin cell flow battery using 0.05 M DBBB and 0.05 M 2,3,6-trimethylquinoxaline as the positive and negative electrode species. Representative charge-discharge profiles of the cell over (B) the first 4 cycles and (C) $14^{th}$-$17^{th}$ cycle. An electrolyte solution of 0.05 M DBBB and 0.05 M 2,3,6-trimethylquinoxaline in Electrolyte B was used for both the positive and negative compartments. A NAFION® 117 membrane pre-soaked in Electrolyte B. The voltage range was 0.1-2.5 V and the charge/discharge currents were about 0.1 mA (0.0625 $mA/cm^2$). Evaluations were performed at room temperature.

Based on these results, an all-organic Li ion-based redox flow battery can be constructed using a 2,5-di-tert-butyl-1, 4-dialkoxybenzene compound such as DBBB and a quinoxaline compound such as 2,3,6-trimethylquinoxaline as positive and negative electrode materials, respectively (FIG. 4). As a proof-of-principle system, two electrolyte-soaked porous carbon paper electrodes were separated by a NAFION® 117 membrane and then sealed in a coin cell configuration, which is typically used for Li ion battery testing. Both carbon electrodes, which function as current collectors, were pre-soaked in an electrolyte solution consisting of 0.05 M DBBB and 0.05 M 2,3,6-trimethylquinoxaline in Electrolyte B. The NAFION® membrane, which conducts the Li cations and blocks reactant crossover, also was pre-soaked in Electrolyte B. Identical solutions were used on either side of the membrane to minimize concentration gradient driven reactant crossover, which degrades cell performance [28].

FIG. 4a shows stable coin cell performance of the cell over the course of 30 discharge-charge cycles (several days). Over the first four cycles, the coin cell transitions from a lower potential charge feature of 1.2-1.8 V to a higher potential charge feature of 1.8-2.4 V. This transition corresponds to the growth of the higher potential discharge feature near 1.5 V and the reduction of the lower potential discharge feature near 0.6 V (FIG. 4b). After this initial acclimatization period, the cell charged and discharged at a voltage in the range of about 1.8-2.4 V and 1.6-1.3 V, respectively, for 30 cycles. FIG. 4c shows a representative set of voltage-time profiles. The first cycle efficiency is about 43%, after which the coulombic efficiency increases to about 70-75% which compares favorably with previously-reported efficiencies for non-aqueous flow batteries [8-11]. These efficiencies are expected to increase with advances in cell design and operation (e.g., pre-charging electrolytes), as well as improvements in materials design (e.g., non-aqueous membranes).

The use of electroactive organic species offers significant opportunities for the design and synthesis of redox flow batteries with tailorable redox potentials and activities. Furthermore, the choice of electrolyte can have significant effects on the performance of each redox species depending on solution-phase interactions. Optimization of the electrolyte-redox species relationship can be performed based on the cost and safety of each electrolyte system under consideration.

EXAMPLE 2

Baseline (Comparative) Electrolyte Compositions

Three different baseline electrolytes compositions were used in the exemplary batteries: Electrolyte A: 1.2 M lithium hexafluorophosphate in a mixture of ethylene carbonate and ethyl methyl carbonate at a volume ratio of about 3 to 7 (Tomiyama High Purity Chemical Industries Ltd.); Electrolyte B: 0.2 M lithium tetrafluoroborate (98% pure, anhydrous, Acros Organics) in propylene carbonate (99.7% pure, anhydrous, Aldrich); and Electrolyte C: 1.2 M lithium hexafluorophosphate in a mixture of ethylene carbonate and ethyl methyl carbonate at a weight ratio of about 3 to 7 (Tomiyama High Purity Chemical Industries Ltd.). All chemicals were used as received and stored in an Argon-filled glove box. All solutions were prepared in the glove box.

Apparatus, Instrumentation and Methodology.

Cyclic voltammetry (CV) were performed in a custom-made airtight three-electrode electrochemical cell with a 2-mm diameter platinum disk working electrode and lithium metal counter and reference electrodes. Prior to use, the platinum disk electrode was dipped in nitric acid solution (about 50 vol % $HNO_3$, Ricca Chemical Company) and then polished on a MICROCLOTH® pad with 0.3 μm and 0.05 μm alumina (Buehler Ltd., Lake Bluff, Ill.). After polishing, the electrode was thoroughly rinsed with distilled water and dried with house nitrogen. The electrochemical cell was then assembled in an Argon-filled glove box and transferred out to perform measurements. Evaluations were performed on a 1470E Solartron Analytical Instrument at scan rates of 5, 10, 20, 50, 100, and 200 mV/s. All evaluations were performed in triplicate at room temperature.

Charge-discharge studies were performed using a modified Li-ion coin cell with a NAFION® 117 membrane (Aldrich, about 2 cm² geometric surface area) between two carbon paper electrodes (SPECTRACARB® 2050A, 0.22 g/cm³ density, 0.06 cm thickness, about 1.6 cm² geometric surface area). Prior to assembly, the NAFION® membrane was soaked in solutions of propylene carbonate and 0.2 M $LiBF_4$ in propylene carbonate for several days. The positive and negative carbon paper electrodes were soaked in the same solution of 0.05 M DBBB, 0.05 M 2,3,6-trimethylquinoxaline, 0.2 M $LiBF_4$, in propylene carbonate for about 1 to 2 hours prior to use. The coin cell was assembled and sealed in an Argon-filled glove box and transferred out to perform measurements. Testing was performed using a battery cycler (Maccor) at room temperature. The cell was cycled between 0.1 and 2.5 V at a charge/discharge current of 0.1 mA, corresponding to a current density of about 0.0625 mA/cm², for 50 cycles.

Average Peak Potential Determination.

Figure 6:
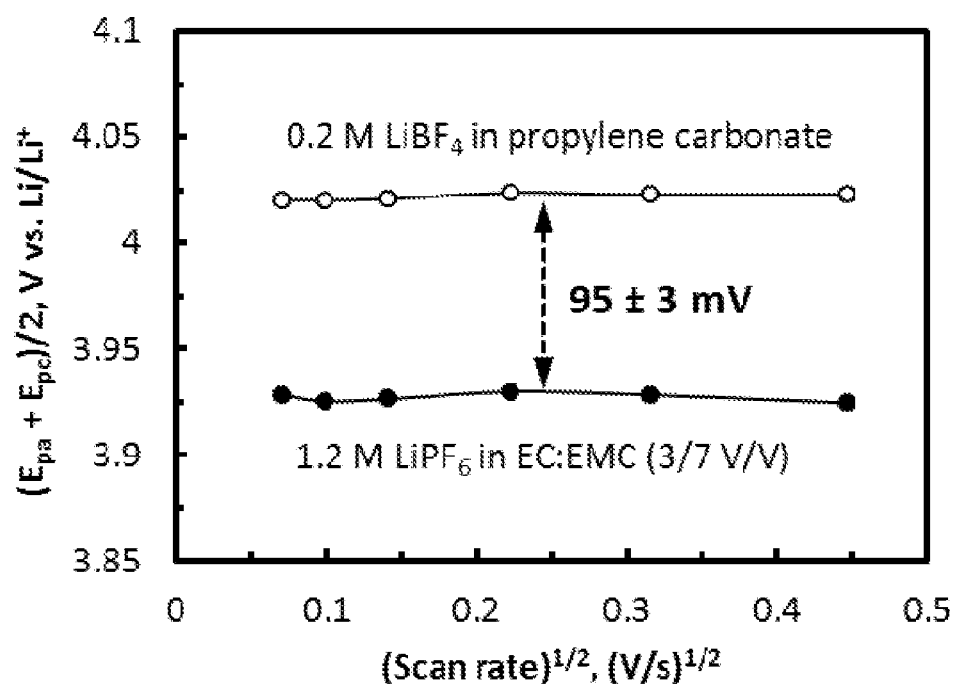
FIG. 6 shows average redox peak potential of 0.005 M DBBB in Electrolyte A and Electrolyte B over a range of scan rates (5, 10, 20, 50, 100, and 200 mV/s). Evaluations were performed in triplicate in a Pt/Li/Li cell at room temperature.
Figure 7:
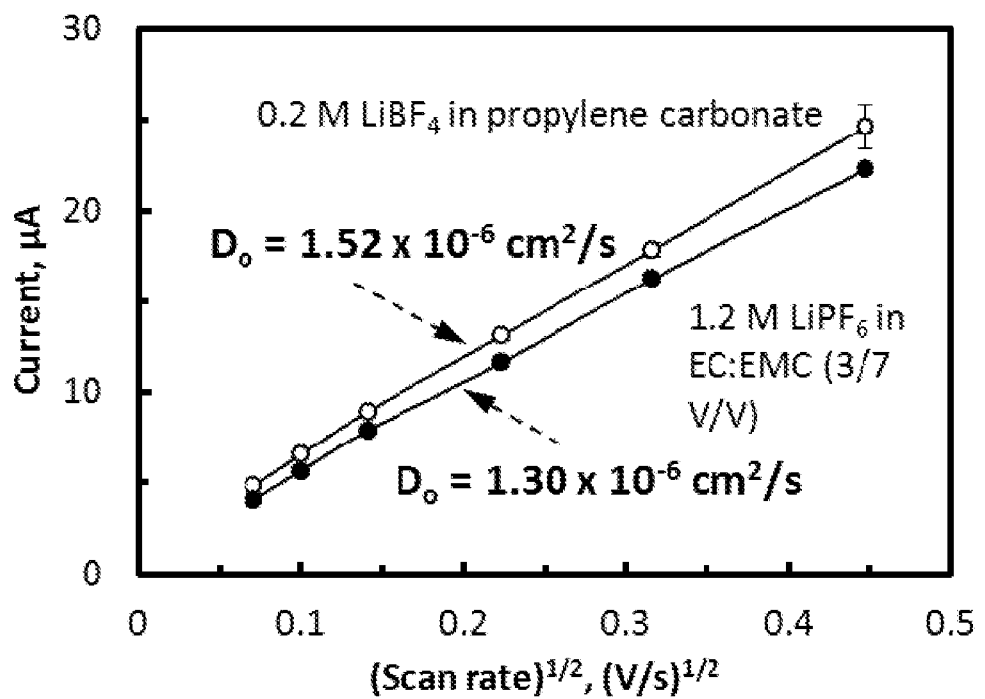
FIG. 7 shows the dependence of peak current on scan rate (5, 10, 20, 50, 100, and 200 mV/s) for 0.005 M DBBB in Electrolyte A and Electrolyte B. Evaluations were performed in triplicate in a Pt/Li/Li cell.

The redox potential of DBBB was calculated by averaging the oxidation and reduction peak potentials in the two different electrolytes at various scan rates (5, 10, 20, 50, 100, and 200 mV/s). As shown in FIG. 2a, with increasing scan rate the oxidation and reduction peak potentials shift to higher and lower potentials, respectively. The shift in the peak potential with the scan rate may be caused by the limited charge-transfer kinetics of the active species (DBBB) and the uncompensated resistance, which is commonly called the "iR drop". Because the polarization from the kinetic effect and iR drop is triggered by the current flowing through the electrochemical cell, the average peak potential [$(E_{pa}+E_{pc})/2$] gives a good estimation of the redox potential of the reversible electroactive species. FIG. 6 shows the average redox peak potential of 0.005 M DBBB in Electrolyte A and Electrolyte B over a range of scan rates (5, 10, 20, 50, 100, and 200 mV/s). Evaluations were performed in triplicate in a Pt/Li/Li cell at room temperature.

EXAMPLE 3

Other Negative Redox Materials

In addition to the quinoxaline materials, dipyridyl ketones also are useful as redox reactant components of the negative electrolyte. For example, the redox activity of di-(2-pyridyl) ketone (1):

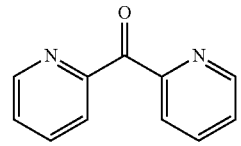

Figure 8:
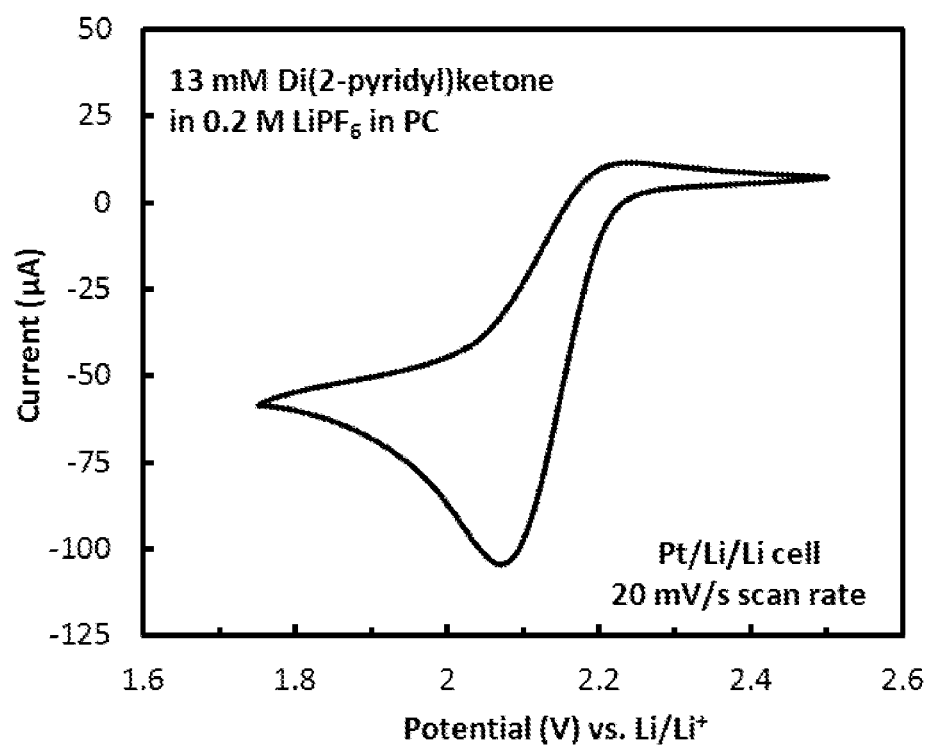
FIG. 8 shows a cyclic voltammogram of 13 mM di-(2-pyridyl) ketone in an electrolyte containing 0.2 M $LiPF_6$ in propylene carbonate at 20 mV/s in a Pt/Li/Li cell at 20 mV/s.
Figure 9:
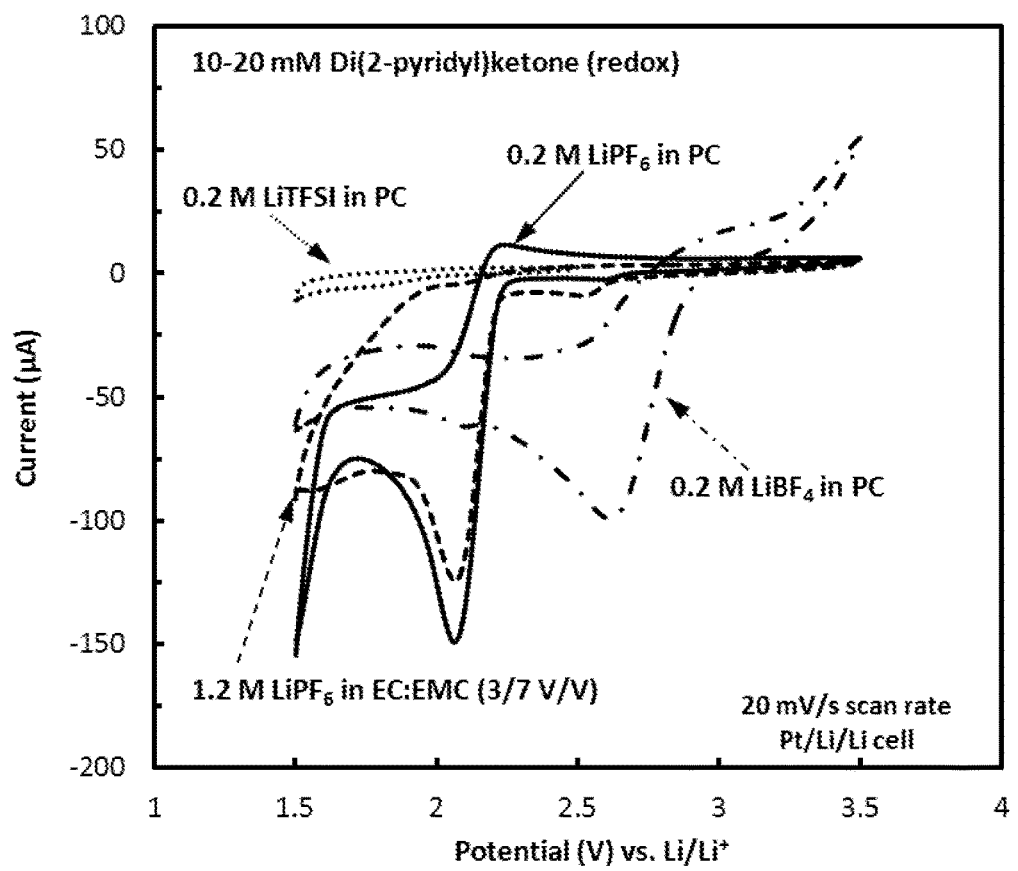
FIG. 9 shows cyclic voltammograms of di-(2-pyridyl) ketone in different electrolyte compositions at 20 mV/s in a Pt/Li/Li cell at 20 mV/s.

(1)

was evaluated in a Pt/Li/Li cell in an electrolyte containing 0.2 M $LiPF_6$ in PC under the conditions described for evaluation of the quinoxaline materials. FIG. 8 shows a cyclic voltammogram of 13 mM di-(2-pyridyl) ketone in this electrolyte at a scan rate of about 20 mV/s in a Pt/Li/Li cell at room temperature. FIG. 9 shows cyclic voltammograms of di-(2-pyridyl) ketone in different electrolyte compositions at a scan rate of about 20 mV/s in a Pt/Li/Li cell at room temperature. In each case the di-(2-pyridyl) ketone concentration was in the range of 10 to 20 mM. The electrolytes evaluated included 0.2 M $LiPF_6$ in PC, Electrolyte A, Electrolyte B, and 0.2 M lithium bis(trifluoromethanesulfonyl)imide (LiTFSI) in PC. The choice of electrolyte composition clearly had a significant effect on the redox activity of di-(2-pyridyl) ketone.

Figure 19:
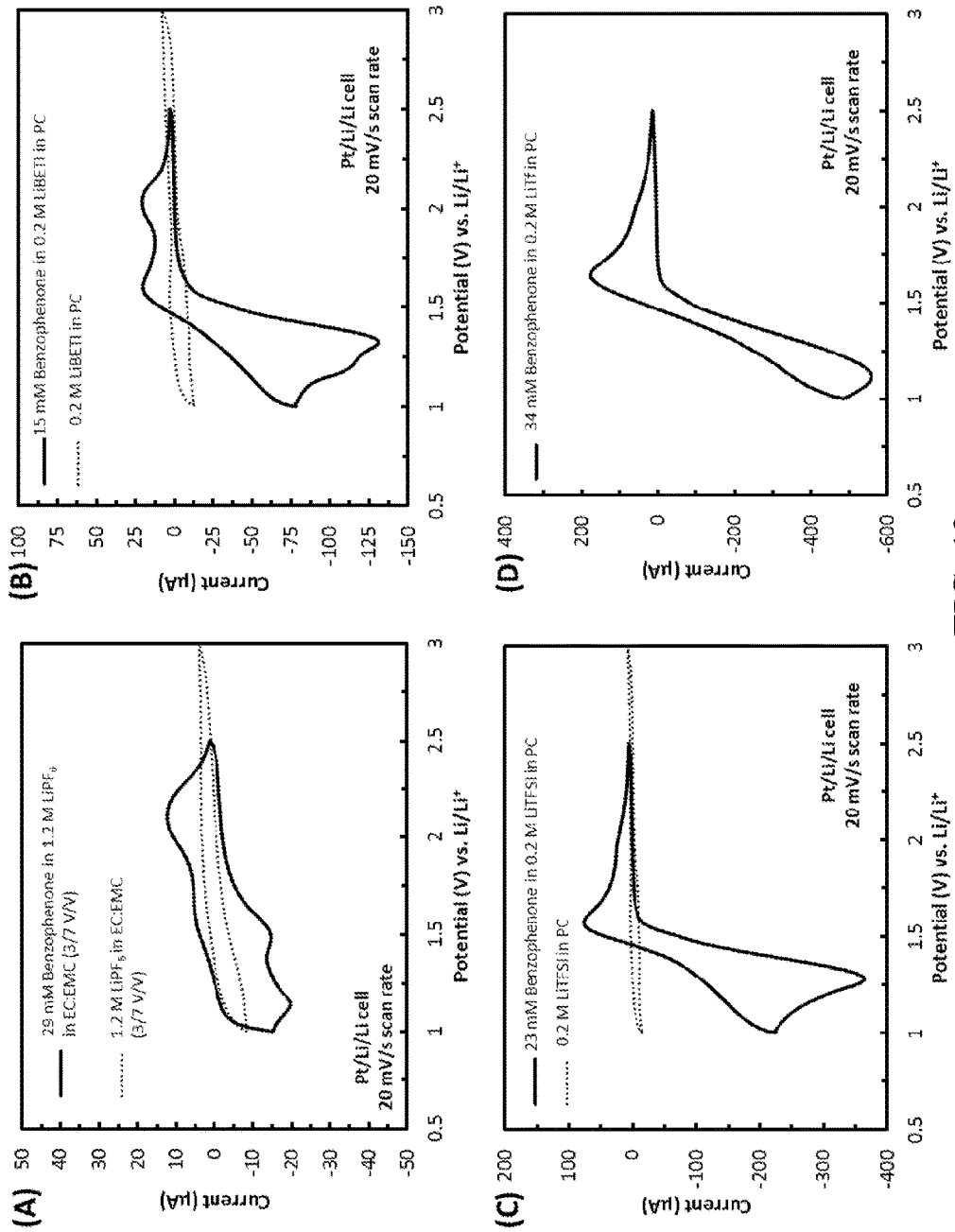
FIG. 19 shows a cyclic voltammogram of benzophenone in (A) Electrolyte A; (B) LiBETI and PC; (C) LiTFSI and PC, and (D) Lithium triflate and PC, each in a Pt/Li/Li cell at 20 mV/s. The lighter dashed cyclic voltammograms in (A), (B) and (C) represent the electrolyte baselines without any redox species.
Figure 20:
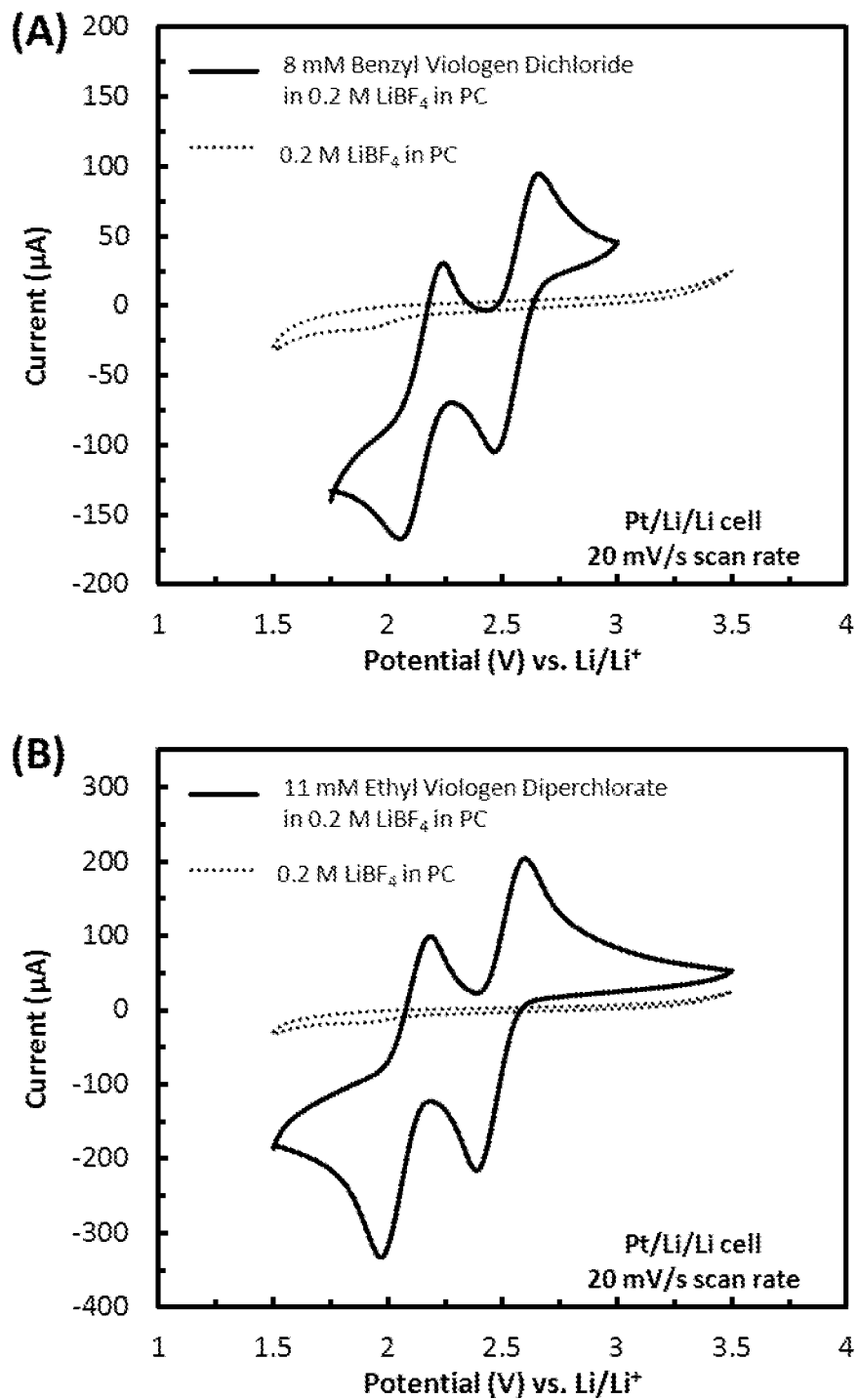
FIG. 20 shows a cyclic voltammogram of (A) 8 mM bis-benzyl viologen dichloride, and (B) 11 mM bis-ethyl viologen diperchlorate, each in Electrolyte B in a Pt/Li/Li cell at 20 mV/s. The lighter dashed cyclic voltammograms in (A) and (B) represent Electrolyte B without any redox species.

FIG. 19 and FIG. 20 provide cyclic voltammograms of two additional negative redox materials, i.e., benzophenone (FIG. 19) and viologen compounds (bis-benzyl-4,4'-bipyridinium dichloride and bis-ethyl-4,4'-bipyridinium diperchlorate; FIG. 20). Benzophenone was evaluated at a concentration of about 29 mM in Electrolyte A (FIG. 19(A)), 15 mM in 0.2 M LiBETI in PC (FIG. 19(B)), 23 mM in 0.2 M LiTFSI in PC (FIG. 19(C)), and 34 mM in 0.2 M Li triflate in PC (FIG. 19(D)), each in a Pt/Li/Li cell at a scan rate of 20 mV/s. The benzyl viologen compound was evaluated at a concentration of about 8 mM in Electrolyte B (FIG. 20(A)), and the ethyl viologen compound was evaluated at a concentration of about 11 mM in Electrolyte B (FIG. 20(B), each in a Pt/Li/Li cell at a scan rate of 20 mV/s. Each of these materials exhibited suitable redox properties for use in negative electrolytes of the present invention.

EXAMPLE 4

Other Positive Redox Materials

In addition to DBBB, the redox activity of other 2,4-di-tert-butyl-1,4-dialkoxybenzene compounds were evaluated under conditions similar to those described above for DBBB. For example, the redox activity of the bis-1,4-(2,2,2-trifluoroethyl) ether (2) and the bis-methyl ether (3):

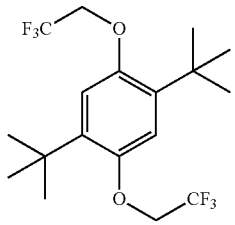
(2)

Figure 10:
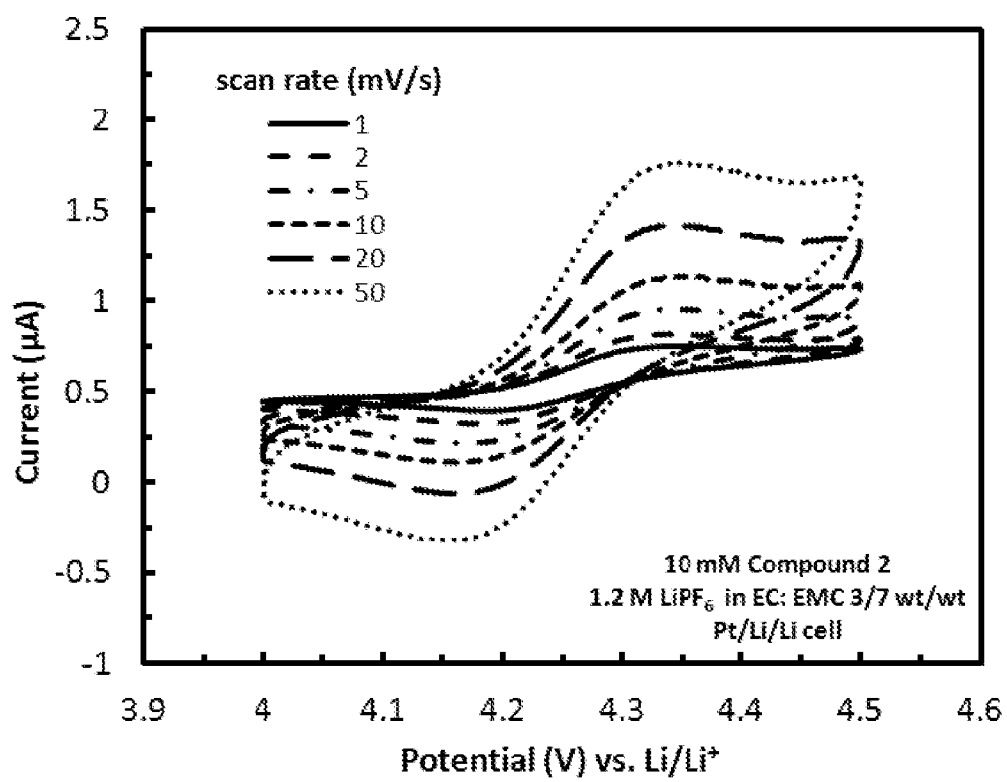
FIG. 10 shows cyclic voltammograms of 10 mM 2,5-di-tert-butyl-1,4-bisalkoxybenzene (2) in Electrolyte C (1.2 M $LiPF_6$ in a mixture of ethylene carbonate (EC) and ethyl methyl carbonate (EMC) in a EC/EMC weight ratio of about 3/7) in a Pt/Li/Li cell at varying scan rates.
Figure 11:
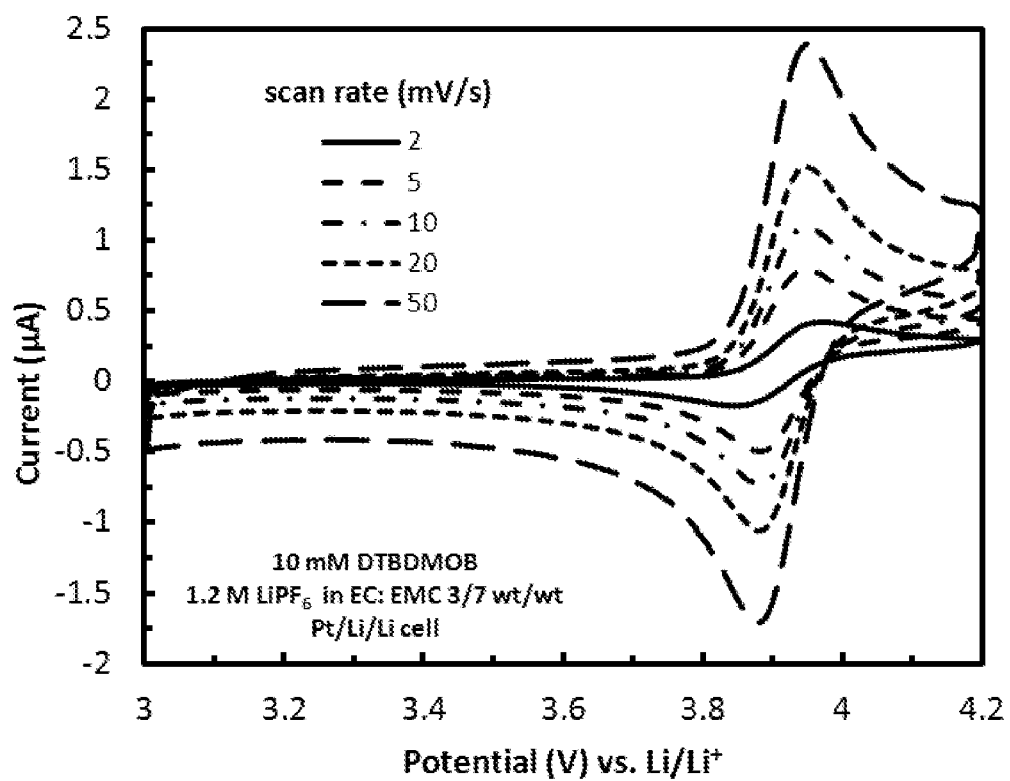
FIG. 11 shows cyclic voltammograms of 10 mM 2,5-di-tert-butyl-1,4-dimethoxybenzene (3) in Electrolyte C in a Pt/Li/Li cell at varying scan rates.

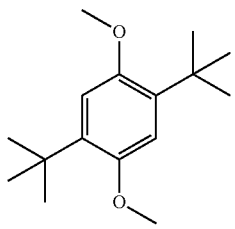
(3)

were evaluated in 1.2 M LiPF$_6$ in ethylene carbonate/ethyl methyl carbonate in a weight ratio of about 3 to 7 ("Electrolyte C"), described above in Pt/Li/Li cells. The cyclic voltammograms are shown in FIG. 10 (at 1, 2, 5, 10, 20, and 50 mV/s scan rates) and FIG. 11 (at 2, 5, 10, 20 and 50 mV/s scan rates) for the bis-trifluoroethyl ether and the bis-methyl ether, respectively. The concentration of compounds (2) and (3) were about 10 mM each.

Phenothiazine compounds, e.g., Compound (4), also are useful as positive redox materials.

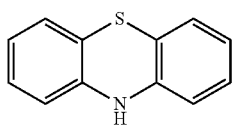
(4)

Figure 12:
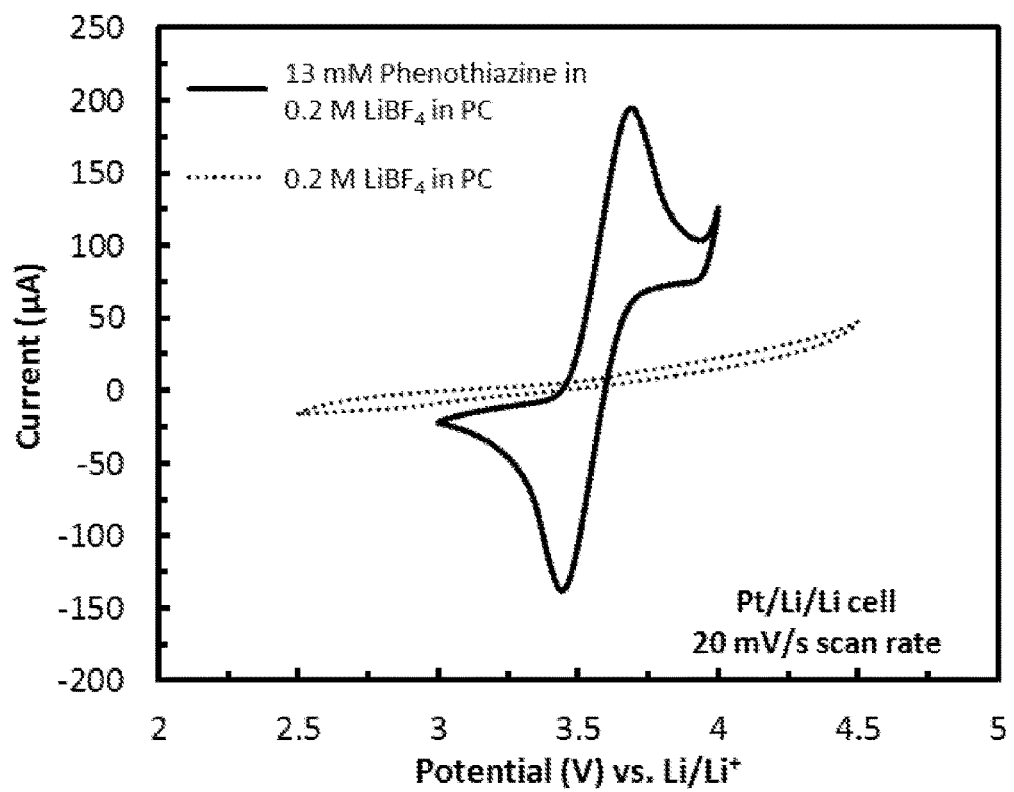
FIG. 12 provide a cyclic voltammograms of 13 mM phenothiazine (4) in Electrolyte B in a Pt/Li/Li cell at 20 mV/s. The lighter dashed cyclic voltammogram represents Electrolyte B without any redox species.

The redox activity of phenothiazine (4) is illustrated by the cyclic voltammogram shown in FIG. 12, taken with about a 13 mM concentration of compound (4) in Electrolyte A described above, in a Pt/Li/Li cell at 20 mV/s scan rate.

Catechol ether (5) and catechol phenylborate esters (6), (7) and (8) also have redox properties suitable for use as redox reactants for the positive electrolyte.

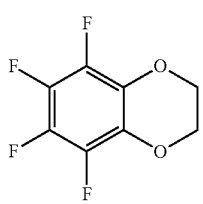
(5)

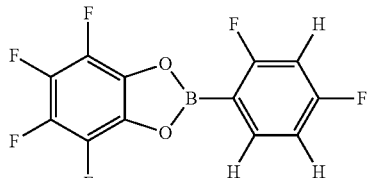
(6)

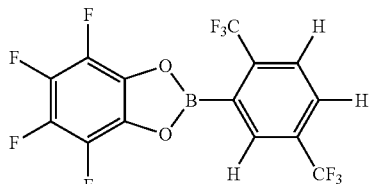
(7)

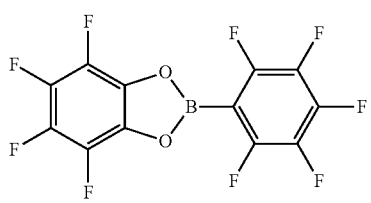
(8)

Figure 13:
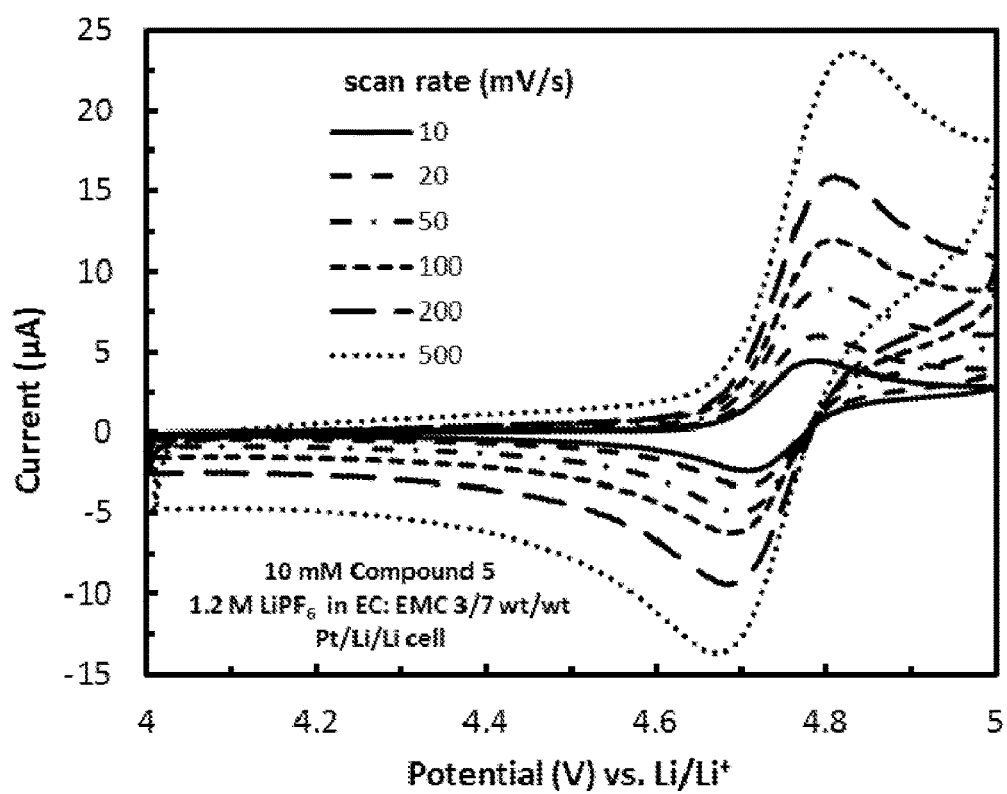
FIG. 13 shows a cyclic voltammogram of 10 mM catechol ether (5) in Electrolyte C in a Pt/Li/Li cell at varying scan rates.
Figure 14:
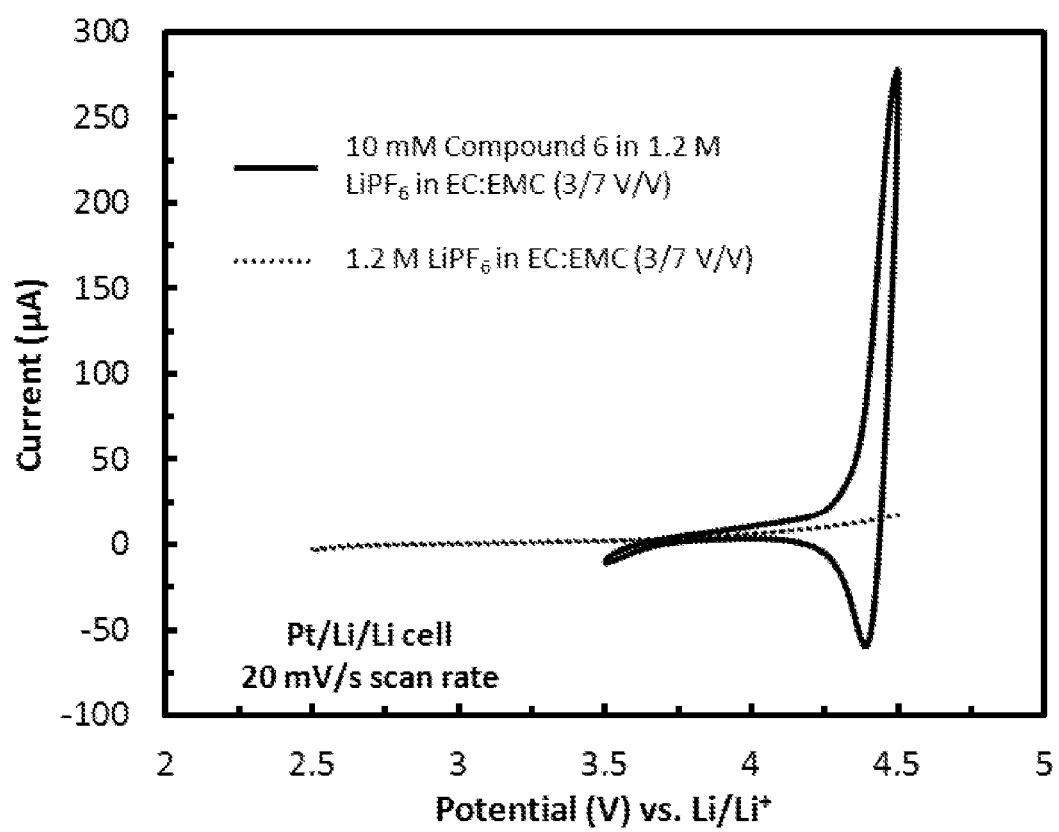
FIG. 14 shows a cyclic voltammogram of 10 mM catechol phenylborate ester (6) in Electrolyte A in a Pt/Li/Li cell at 20 mV/s. The lighter dashed cyclic voltammogram represents Electrolyte A without any redox species.
Figure 15:
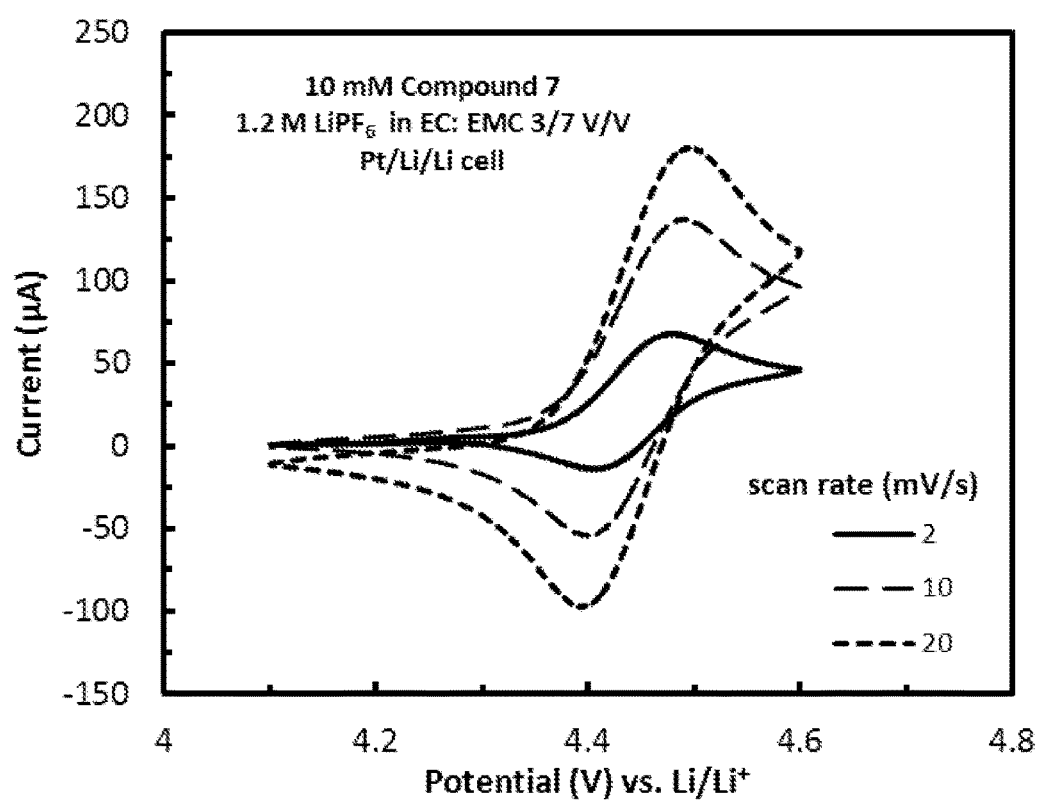
FIG. 15 shows a cyclic voltammogram of 10 mM catechol phenylborate ester (7) in Electrolyte A in a Pt/Li/Li cell at varying scan rates.
Figure 16:
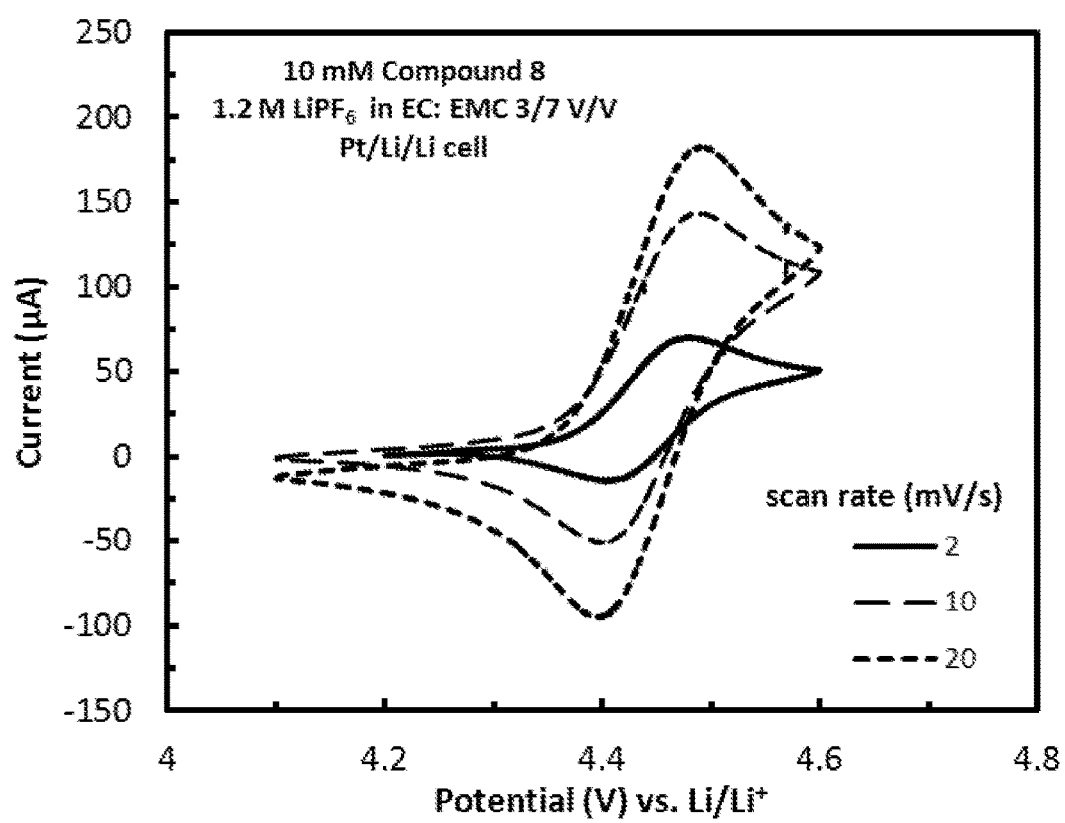
FIG. 16 shows a cyclic voltammogram of 10 mM catechol phenylborate ester (8) in Electrolyte A in a Pt/Li/Li cell at varying scan rates.

The redox activities of compounds (5), (6), (7) and (8) are illustrated by the cyclic voltammograms shown in FIGS. 13, 14, 15, and 16, respectively. FIG. 13 is taken in Electrolyte C, described above, and FIGS. 14, 15 and 16 are taken in Electrolyte A, described above. All evaluations are performed in a Pt/Li/Li cell at various scan rates using protocols similar to those used for the other examples discussed herein. The concentration of compounds (5), (6), (7), and (8) were about 10 mM each.

Figure 17:
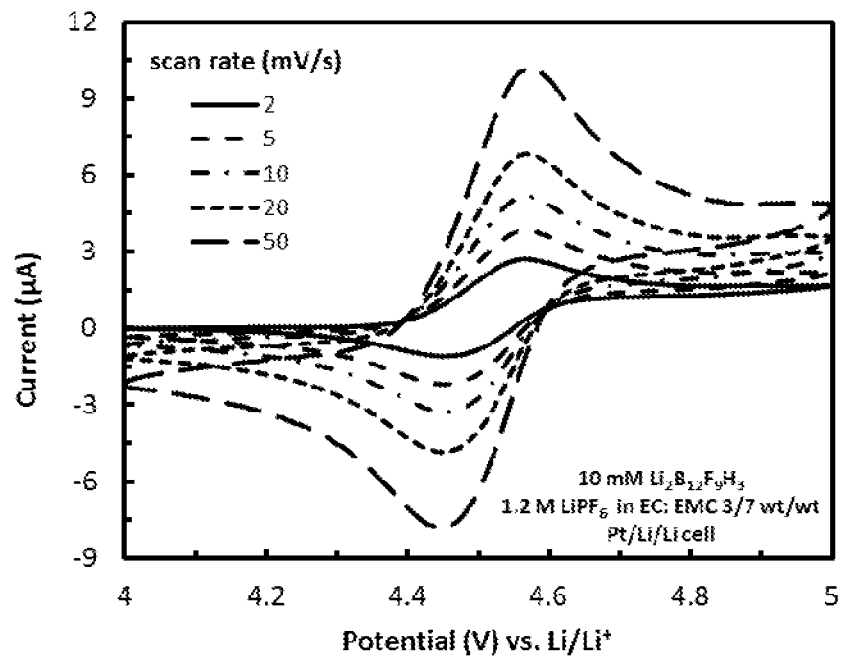
FIG. 17 shows a cyclic voltammogram of 10 mM borane cluster (9) in Electrolyte C in a Pt/Li/Li cell at varying scan rates.
Figure 18:
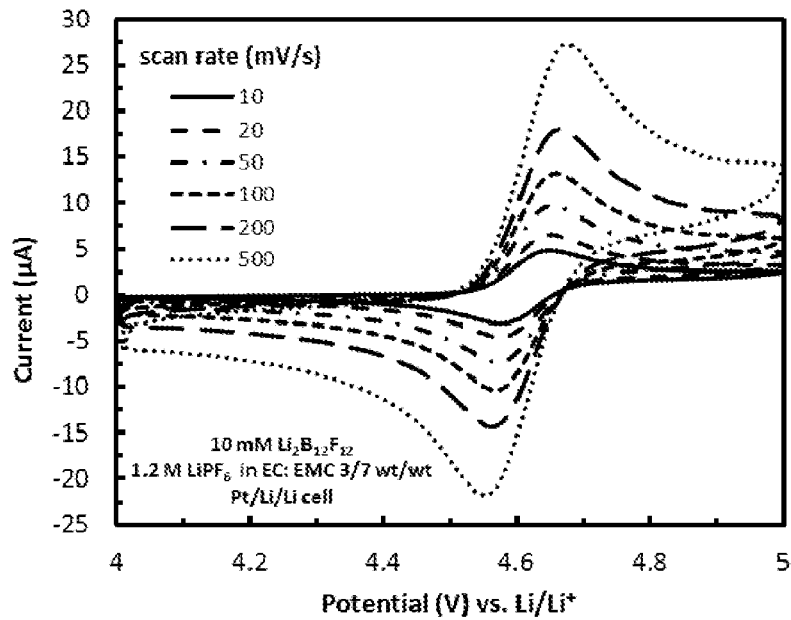
FIG. 18 shows a cyclic voltammogram of 10 mM borane cluster (10) in Electrolyte C in a Pt/Li/Li cell at varying scan rates.

Lithium halogen-substituted borane cluster compounds, such as Li$_2$B$_{12}$F$_9$H$_3$ (9) and Li$_2$B$_{12}$F$_{12}$ (10) also can be used as redox reactants in the positive electrolytes. Cyclic voltammograms of compounds (9) and (10) in Electrolyte C, described above, in a Pt/Li/Li cell at various scan rates using protocols similar to those used for the other examples discussed herein, are shown in FIGS. 17 and 18, respectively. The concentration of compounds (9) and (10) were about 10 mM each.

Figure 21:
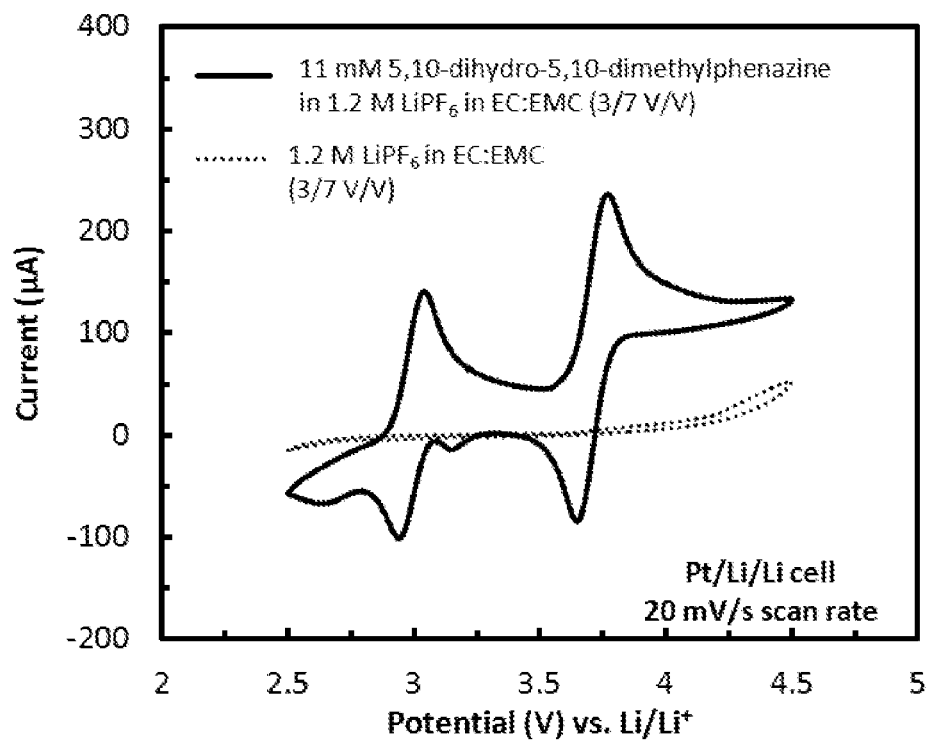
FIG. 21 shows a cyclic voltammogram of 11 mM 5,10-dihydro-5,10-dimethylphenazine in Electrolyte A in a Pt/Li/Li cell at 20 mV/s. The lighter dashed cyclic voltammogram represents Electrolyte A without any redox species.

In addition, a 5,10-dihydro-5,10-dialkylphenazine compound (i.e., 5,10-dihydro-5,10-dimethylphenazine) was evaluated at a concentration of about 11 mM in Electrolyte A in a Pt/Li/Li cell at 20 mV/s scan rate. FIG. 21 provides the cyclic voltammogram obtained from this evaluation, which demonstrates suitable redox properties for use in the present invention.

Alternatively, lithium-ion battery redox shuttle materials such as a halogenated 5-phenyl-1,3,2-benzodioxaborole compound (e.g., 2-(pentafluorophenyl)-tetrafluoro-1,3,2-benzodioxaborole), a 4,6-di-tert-butyl-1.3-benzodioxole compound (e.g., 4,6-di-tert-butyl-1,3,-benzodioxole), a 5,7-di-tert-butyl-benzodioxin compound (e.g., 5,7-di-tert-butyl-benzodioxin), a 1,4-dialkoxy-2,5 bisphosphinyl benzene compound(e.g., 1,4-dimethoxy-2,5-bis[bis(1-methylethyl) phosphinyl]-benzene), and a 2,5-di-tert-butyl-1,4-phenylene diphosphate ester (e.g., tetraethyl-2,5-di-tert-butyl-1,4-phenylene diphosphate) can be used as the redox reactant of the positive electrolyte.

Three other positive redox materials of considerable utility are 1,2,4,5-tetrafluoro-3,6-dimethoxybenzene (TFDMB), 1,2,4,5-tetrafluoro-3,6-diethoxybenzene (TFDEB), and 1,2, 4,5-tetrafluoro-3,6-bis(2-methoxyethoxy)benzene (TFB-MEB), each of which is a compound of Formula (III), described herein above, in which each of $R^{15}$, $R^{16}$, $R^{17}$, and $R^{18}$ independently is F and each of $R^{19}$ and $R^{20}$ is either methyl (TFDMB), ethyl (TFDEB) or methoxyethyl (TFB-MEB). Surprisingly, TFBMEB is a liquid at ambient room temperature, which is particularly advantageous for use in the redox flow batteries described herein, since auxiliary solvent can be minimized or eliminated.

Each of TFDMB, TFDEB, and TFBMEB exhibited high potential (4.6 to 4.7 V), reversible redox behavior when evaluated at a 10 mM concentration in an electrolyte comprising 1.2 M $LiPF_6$ in EC/EMC (3:7 by weight) at various scan rates (10 mV to 500 mV) using Pt/Li/Li electrodes. Table 1 provides a summary of the useful redox properties of these compounds.

TABLE 1

| Compound | Potential (V vs. Li/Li) | Molecular Weight | Intrinsic Capacity (mAh/g) | Energy Density (Wh/Kg) |
|---|---|---|---|---|
| TFDMB | 4.70 | 210.0 | 127.6 | 599.7 |
| TFDEB | 4.63 | 238.1 | 112.5 | 520.9 |
| TFBMEB | 4.70 | 298.2 | 89.9 | 422.5 |

EXAMPLE 6

Sodium-Based Batteries

Figure 22:
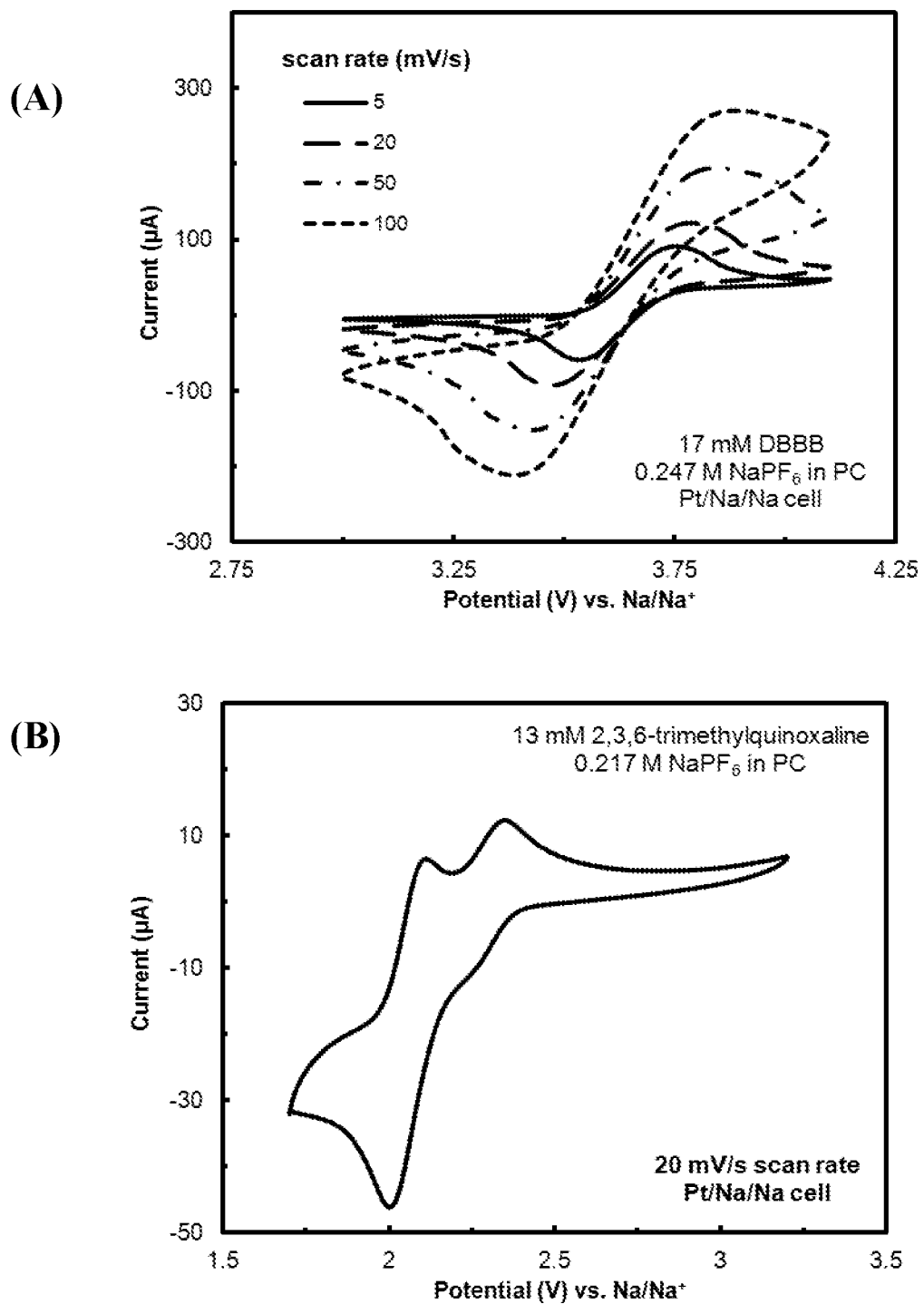
FIG. 22 shows cyclic voltammograms of (A) 17 mM DBBB in 0.247 M NaPF$_6$ in PC in a Pt/Na/Na cell at varying scan rates; and of (B) 13 mM 2,3,6-trimethylquinoxaline in 0.217 M NaPF$_6$ in PC in a Pt/Na/Na cell at 20 mV/s.

The redox materials described herein also can be utilized with sodium-based electrolyte salts. For example, FIG. 22(a) provides a cyclic voltammogram obtained with about 17 mM DBBB in 0.247 M Na $PF_6$ in propylene carbonate, in a Pt/Na/Na cell at scan rates of 5, 20, 50, and 100 mV/s. FIG. 22(b) provides a cyclic voltammogram obtained with about 13 mM 2,3,6-trimethylquinoxaline in 0.217 M $NaPF_6$ in propylene carbonate at a 20 mV/s scan rate. The data in FIG. 22 demonstrate suitable reversible redox properties for these materials when utilized in a sodium electrolyte system.

Selection of Negative and Positive Redox Materials.

The redox reactants of the anolyte and catholyte are selected such that the redox reactant of the catholyte has a higher redox potential that the redox reactant of the anolyte. For anolyte redox species, voltammogram potentials should ideally be as low as possible or practical. For catholyte redox species, voltammogram potentials should ideally be as high as possible or practical. Preferably, both redox species would facilitate multi-electron transfer indicated by two peaks in the voltammograms (e.g., viologen compounds, and quinoxalines). Furthermore, the height of the redox peak is indicative of activity and the closeness of the oxidation and reduction peaks indicates reversibility. Other factors which can be used to select the materials are solubility, stability, and tendency to exhibit side reactions.

REFERENCES

1. Eyer, J. and G. Corey, *Energy Storage for the Electricity Grid: Benefits and Market Potential Assessment Guide, A Study of the DOE Energy Storage Systems Program.* 2010, Sandia National Laboratories.
2. Crabtree, G., et al., *Integrating Renewable Electricity on the Grid—A Report by the APS Panel on Public Affairs.* 2010, American Physical Society: Washington D.C.
3. Skyllas-Kazacos, M., et al., *Progress in Flow Battery Research and Development.* Journal of the Electrochemical Society, 2011. 158(8): p. R55-R79.
4. Weber, A. Z., et al., *Redox flow batteries: a review.* Journal of Applied Electrochemistry, 2011. 41(10): p. 1137-1164.
5. Yang, Z., et al., *Electrochemical Energy Storage for Green Grid.* Chemical Reviews, 2011. 111(5): p. 3577-3613.
6. Ponce de Leon, C., et al., *Redox flow cells for energy conversion.* Journal of Power Sources, 2006. 160(1): p. 716-732.
7. Matsuda, Y., et al., *A Rechargeable Redox Battery Utilizing Ruthenium Complexes with Non-aqueous Organic Electrolyte.* Journal of Applied Electrochemistry, 1988. 18(6): p. 909-914.
8. Chakrabarti, M. H., R. A. W. Dryfe, and E. P. L. Roberts, *Evaluation of electrolytes for redox flow battery applications.* Electrochimica Acta, 2007. 52(5): p. 2189-2195.
9. Liu, Q., et al., *Non-aqueous chromium acetylacetonate electrolyte for redox flow batteries.* Electrochemistry Communications, 2010. 12(11): p. 1634-1637.
10. Liu, Q., et al., *Non-aqueous vanadium acetylacetonate electrolyte for redox flow batteries.* Electrochemistry Communications, 2009. 11(12): p. 2312-2315.
11. Sleightholme, A. E. S., et al., *Non-aqueous manganese acetylacetonate electrolyte for redox flow batteries.* Journal of Power Sources, 2011. 196(13): p. 5742-5745.
12. Kim, J.-H., et al., *Development of metal-based electrodes for non-aqueous redox flow batteries.* Electrochemistry Communications, 2011. 13(9): p. 997-1000.
13. Duduta, M., et al., *Semi-Solid Lithium Rechargeable Flow Battery.* Advanced Energy Materials, 2011. 1(4): p. 511-516.
14. Chen, Z., Y. Qin, and K. Amine, *Redox shuttles for safer lithium-ion batteries.* Electrochimica Acta, 2009. 54(24): p. 5605-5613.
15. Abraham, K. M., D. M. Pasquariello, and E. B. Willstaedt, *n-Butylferrocene for Overcharge Protection of Secondary Lithium Batteries.* Journal of the Electrochemical Society, 1990. 137(6): p. 1856-1857.
16. Moshurchak, L. M., et al., *High-Potential Redox Shuttle for Use in Lithium-Ion Batteries.* Journal of the Electrochemical Society, 2009. 156(4): p. A309-A312.
17. Behl, W. K. and D. T. Chin, *Electrochemical Overcharge Protection of Rechargeable Lithium Batteries. I. Kinetics of Iodide/Tri-Iodide/Iodine Redox Reactions on Platinum in $LiAsF_6$ Tetrahydrofuran solutions.* Journal of the Electrochemical Society, 1988. 135(1): p. 16-21.
18. Behl, W. K. and D. T. Chin, *Electrochemical Overcharge Protection of Rechargeable Lithium Batteries. II. Effect of Lithium Iodide-Iodine Additives on the Behavior of Lithium Electrode in $LiAsF_6$-Tetrahydrofuran Solutions.* Journal of the Electrochemical Society, 1988. 135(1): p. 21-25.
19. Amine, K., L. Zhang, and Z. Z. Zhang. *Develop and evaluate materials and additives that enhance thermal and overcharge abuse.* in *Department of Energy Advanced Battery Research Review.* 2010. Washington, D.C.
20. Chen, Z., et al., *Lithium Borate Cluster Salts as Redox Shuttles for Overcharge Protection of Lithium-Ion Cells.* Electrochemical and Solid State Letters, 2010. 13(4): p. A39-A42.
21. Armand, M., et al., *Conjugated dicarboxylate anodes for Li-ion batteries.* Nature Materials, 2009. 8(2): p. 120-125.
22. Walker, W., et al., *Ethoxycarbonyl-Based Organic Electrode for Li-Batteries.* Journal of the American Chemical Society, 2010. 132(18): p. 6517-6523.

23. Walker, W., et al., *Electrochemical characterization of lithium 4,4'-tolane-dicarboxylate for use as a negative electrode in Li-ion batteries.* Journal of Materials Chemistry, 2011. 21(5): p. 1615-1620.
24. Chang, D. W., et al., *Novel Quinoxaline-Based Organic Sensitizers for Dye-Sensitized Solar Cells.* Organic Letters, 2011. 13(15): p. 3880-3883.
25. Lee, J.-Y., et al., *Low band-gap polymers based on quinoxaline derivatives and fused thiophene as donor materials for high efficiency bulk-heterojunction photovoltaic cells.* Journal of Materials Chemistry, 2009. 19(28): p. 4938-4945.
26. Matsunaga, T., et al., *High-performance Lithium Secondary Batteries Using Cathode Active Materials of Triquinoxalinylenes Exhibiting Six Electron Migration.* Chemistry Letters, 2011. 40(7): p. 750-752.
27. Buhrmester, C., et al., *Studies of aromatic redox shuttle additives for LiFePO$_4$-based Li-ion cells.* Journal of the Electrochemical Society, 2005. 152(12): p. A2390-A2399.
28. Wang, W., et al., *A new redox flow battery using Fe/V redox couples in chloride supporting electrolyte.* Energy & Environmental Science, 2011. 4(10): p. 4068-4073.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All numerical values obtained by measurement (e.g., weight, concentration, physical dimensions, removal rates, flow rates, and the like) are not to be construed as absolutely precise numbers, and should be considered to encompass values within the known limits of the measurement techniques commonly used in the art, regardless of whether or not the term "about" is explicitly stated. All methods described herein can be performed in any suitable order unless otherwise indicated herein or otherwise clearly contradicted by context. The use of any and all examples, or exemplary language (e.g., "such as") provided herein, is intended merely to better illuminate certain aspects of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Specific embodiments of the invention in which an exclusive property or privilege is claimed are defined as follows:

1. A non-aqueous redox flow battery comprising a negative electrode immersed in a non-aqueous liquid negative electrolyte, a positive electrode immersed in a non-aqueous liquid positive electrolyte, and a cation-permeable separator between the negative and positive electrolytes;

the negative electrode being positioned within a negative electrolyte chamber ("NE chamber") defined by a first housing and containing the negative electrolyte, the NE chamber connecting with a first negative electrolyte reservoir ("NE reservoir") and a second NE reservoir such that the first NE reservoir, the NE chamber, and the second NE reservoir can be placed in fluid-flow communication and collectively define a negative electrolyte circulation pathway; a first pump being operably positioned within the negative electrolyte circulation pathway to circulate the negative electrolyte back and forth between the first NE reservoir and the second NE reservoir over the negative electrode;

the positive electrode being positioned within a positive electrolyte chamber ("PE chamber") defined by a second housing and containing the positive electrolyte, the PE chamber connecting with a first positive electrolyte reservoir ("PE reservoir") and a second PE reservoir such that the first PE reservoir, the PE chamber, and the second PE reservoir can be placed in fluid-flow communication and collectively define a positive electrolyte circulation pathway; a second pump being positioned within the positive electrolyte circulation pathway to circulate the positive electrolyte back and forth between the first PE reservoir and the second PE reservoir over the positive electrode;

the negative and positive electrolytes each independently comprising an electrolyte salt, a transition metal-free redox reactant, and optionally an electrochemically stable organic solvent; and the NE chamber and the PE chamber being separated from one another by the cation-permeable separator, such that cations from the electrolyte salt can flow back and forth between the NE chamber and the PE chamber to balance charges resulting from oxidation and reduction of the redox reactants during charging and discharging of the battery;

wherein the redox reactant of the positive electrolyte has a higher redox potential than the redox reactant of the negative electrolyte, the redox reactant of the positive electrolyte comprises a compound selected from the group consisting of:

(a) a compound of Formula (III):

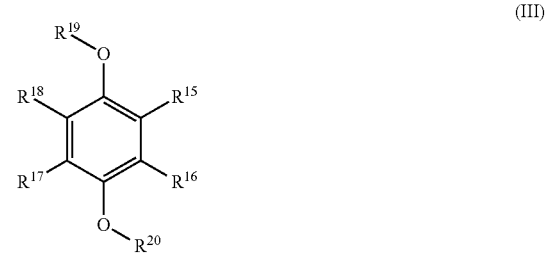

in which each of $R^{15}$, $R^{16}$, $R^{17}$, and $R^{18}$ is F, and each of $R^{19}$ and $R^{20}$ independently is alkyl or alkoxyalkyl; and (b) a compound of Formula (V):

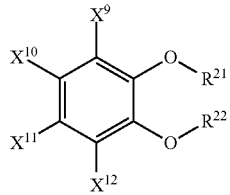

(V)

in which each of $X^9$, $X^{10}$, $X^{11}$, and $X^{12}$ is F, and each of $R^{21}$ and $R^{22}$ independently is alkyl or alkoxyalkyl; and the redox reactant of the negative electrolyte comprises a compound selected from the group consisting of a viologen compound and a dipyridyl ketone compound of Formula (II):

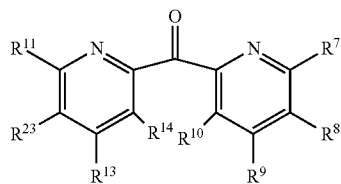

(II)

wherein each of $R^7$, $R^8$, $R^9$, $R^{10}$, $R^{11}$, $R^{12}$, $R^{13}$, and $R^{14}$ independently is selected from the group consisting of H, halogen, alkyl, phenyl, alkoxy, and amino.

2. The non-aqueous redox flow battery of claim 1, wherein the redox reactant of the negative electrolyte is a compound of Formula (II) and each of $R^7$, $R^8$, $R^9$, $R^{10}$, $R^{11}$, $R^{12}$, $R^{13}$, and $R^{14}$ is selected from the group consisting of H, alkyl, and alkoxy.

3. The non-aqueous redox flow battery of claim 1, wherein the redox reactant of the negative electrolyte is a viologen compound selected from the group consisting of bis-benzyl-4,4'-bipyridinium dichloride and bis-ethyl-4,4'-bipyridinium diperchlorate.

4. The non-aqueous redox flow battery of claim 1, wherein the redox reactant of the positive electrolyte is selected from the group consisting of 1,2,4,5-tetrafluoro-3,6-dimethoxybenzene (TFDMB), 1,2,4,5-tetrafluoro-3,6-diethoxybenzene (TFDEB), and 1,2,4,5-tetrafluoro-3,6-bis(2-methoxyethoxy)benzene (TFBMEB).

5. The non-aqueous redox flow battery of claim 1, wherein the cations of the electrolyte salts are selected from $Li^+$ and $Na^+$.

6. The non-aqueous redox flow battery of claim 1, wherein the anions of the electrolyte salts are selected from the group consisting of $BF_4^-$, $PF_6^-$, $ClO_4^-$, $AsF_6^-$, $CF_3SO_3^-$, $N(SO_2CF_3)_2^-$, $N(SO_2CF_2CF_3)^{2-}$, $B(C_2O_4)^{2-}$, and $B_{12}X_nH_{(12-n)}^{2-}$, wherein X=halogen.

7. The non-aqueous redox flow battery of claim 1, wherein the redox reactant of the positive electrolyte is liquid 1,2,4,5-tetrafluoro-3,6-bis(2-methoxyethoxy)benzene, and no electrochemically stable organic solvent is included in the positive electrolyte.

8. The non-aqueous redox flow battery of claim 1, wherein the electrochemically stable organic solvents comprise organic carbonates.

9. The non-aqueous redox flow battery of claim 8, wherein the organic carbonates are selected from the group consisting of ethylene carbonate, propylene carbonate, dimethyl carbonate, diethyl carbonate, ethyl methyl carbonate, and a combination of two or more of the foregoing carbonates.

10. The non-aqueous redox flow battery of claim 1, wherein the redox reactant of the positive electrolyte comprises 1,2,4,5-tetrafluoro-3,6-dimethoxybenzene (TFDMB).

11. The non-aqueous redox flow battery of claim 1, wherein the redox reactant of the positive electrolyte comprises 1,2,4,5-tetrafluoro-3,6-diethoxybenzene (TFDEB).

12. The non-aqueous redox flow battery of claim 1, wherein the redox reactant of the positive electrolyte comprises 1,2,4,5-tetrafluoro-3,6-bis(2-methoxyethoxy)benzene (TFBMEB).

13. The non-aqueous redox flow battery of claim 1, wherein the cation-permeable separator comprises a cation exchange membrane, a porous polymeric material, a porous ceramic material, a porous insulating metal, a zeolite, a cation-conducting glass, and a liquid-liquid interface between immiscible liquids.

14. The non-aqueous redox flow battery of claim 1, wherein the negative electrode and the positive electrode each independently comprises a metal, a carbon material, or a combination thereof.

* * * * *